(12) United States Patent  (10) Patent No.: US 9,054,434 B2
Kakuta et al.  (45) Date of Patent: Jun. 9, 2015

(54) METHOD FOR PRODUCING WIRING HARNESS, AND WIRING HARNESS

(75) Inventors: Tatsuya Kakuta, Yokkaichi (JP);
Takehiro Hosokawa, Yokkaichi (JP);
Kazuyuki Sohma, Yokohama (JP);
Tomoyuki Hattori, Yokohama (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 316 days.

(21) Appl. No.: 13/504,342

(22) PCT Filed: Nov. 19, 2010

(86) PCT No.: PCT/JP2010/070727
§ 371 (c)(1),
(2), (4) Date: Jun. 18, 2012

(87) PCT Pub. No.: WO2011/065310
PCT Pub. Date: Jun. 3, 2011

(65) Prior Publication Data
US 2012/0261186 A1    Oct. 18, 2012

(30) Foreign Application Priority Data

Nov. 25, 2009 (JP) ................................. 2009-266979
Nov. 25, 2009 (JP) ................................. 2009-266987

(51) Int. Cl.
*H01R 9/05* (2006.01)
*H01R 4/72* (2006.01)
(Continued)

(52) U.S. Cl.
CPC .. *H01R 4/72* (2013.01); *H01R 4/22* (2013.01); *H01B 7/2825* (2013.01); *B29C 35/0805* (2013.01); *B29C 2035/0827* (2013.01); *B29C 35/0888* (2013.01)

(58) Field of Classification Search
CPC ............ H01R 4/00; H01R 4/02; H01R 4/021; H01R 4/023; H01R 4/026; H01R 4/029; H01R 4/10; H01R 4/18; H01R 4/184–4/186; H01B 4/20; H01B 4/206; H01B 4/2495; H01B 4/186; H01B 4/188; H01B 43/058; H02G 15/00; H02G 15/02; H02G 15/22; H02G 15/23
USPC ..... 174/74 R, 74 A, 77 R, 78, 82, 84 R, 88 R
See application file for complete search history.

(56) References Cited

U.S. PATENT DOCUMENTS 4,751,350 A * 6/1988 Eaton .............................. 174/87
4,822,434 A  4/1989 Sawaki et al.
(Continued)

FOREIGN PATENT DOCUMENTS

CN    1914771    *  2/2007  ............... H01R 4/22
CN    101248558 A  *  8/2008  ............. H01B 13/32
(Continued)

OTHER PUBLICATIONS

Feb. 8, 2011 International Search Report issued in International Application No. PCT/JP2010/070727 (with translation).
(Continued)

*Primary Examiner* — William H Mayo, III
(74) *Attorney, Agent, or Firm* — Oliff PLC

(57) ABSTRACT

A method for producing a wiring harness including a sealing member having higher airtightness includes a coat formation step of forming a coat by applying a composition solution that contains at least a photo polymerization initiator, a thermal radical polymerization initiator, a redox catalyst and a polymerizable compound to an exposed bunched portion and a coated bunched portion that is adjacent to the exposed bunched portion of the bunch of electric wires, and a light irradiation step of irradiating the coat formed on the exposed bunched portion and the adjacent coated bunched portion with light to photocure the coat.

20 Claims, 13 Drawing Sheets

(51) Int. Cl.
*H01R 4/22* (2006.01)
*H01B 7/282* (2006.01)
*B29C 35/08* (2006.01)

(56) References Cited

U.S. PATENT DOCUMENTS

| | | | | |
|---|---|---|---|---|
| 4,849,580 | A | * | 7/1989 | Reuter ............................ 174/92 |
| 5,589,666 | A | * | 12/1996 | DeCarlo et al. ................. 174/87 |
| 5,622,642 | A | * | 4/1997 | Edwards et al. ............. 219/542 |
| 5,688,601 | A | * | 11/1997 | Usifer et al. .................. 428/457 |
| 6,359,226 | B1 | * | 3/2002 | Biddell et al. .............. 174/74 A |
| 7,232,953 | B2 | * | 6/2007 | Torii et al. ................... 174/74 R |
| 7,511,222 | B2 | * | 3/2009 | Taylor et al. ................ 174/84 R |
| 7,788,803 | B2 | * | 9/2010 | King et al. ..................... 29/883 |
| 7,834,268 | B2 | * | 11/2010 | Ootsuki ....................... 174/74 R |
| 2008/0283268 | A1 | * | 11/2008 | Iwasaki et al. ................. 174/78 |

FOREIGN PATENT DOCUMENTS

| | | |
|---|---|---|
| JP | A-5-190242 | 7/1993 |
| JP | A-2005-347167 | 12/2005 |
| JP | A-2007-317470 | 12/2007 |
| JP | A-2008-117617 | 5/2008 |
| JP | A-2008-123712 | 5/2008 |
| JP | A-2009-079204 | 4/2009 |
| JP | A-2009-130981 | 6/2009 |
| JP | A-2009-205947 | 9/2009 |
| JP | A-2011-113692 | 6/2011 |
| JP | A-2011-113694 | 6/2011 |
| WO | WO 2007/013589 A1 | 2/2007 |

OTHER PUBLICATIONS

Jan. 21, 2014 Japanese Office Action issued in Japanese Application No. 2009-266987 (with translation).

Chinese Office Action issued in Chinese Patent Application No. 201080053501.6 on Feb. 5, 2013 (with translation).

Nov. 27, 2014 extended Search Report issued in European Application No. 10833156.2.

* cited by examiner

US 9,054,434 B2

METHOD FOR PRODUCING WIRING HARNESS, AND WIRING HARNESS

TECHNICAL FIELD

The present invention relates to a method for producing a wiring harness in which a splice is sealed with a resin in order to prevent water immersion.

BACKGROUND ART

Conventionally, wiring harnesses are used for wiring in an automobile. Each of these wiring harnesses is made up of a bunch of electric wires including conductors that are coated with insulations, and includes a splice that is arranged to electrically connect the electric wires. The splice is formed by connecting the conductors by welding, soldering or crimping, which are exposed by peeling the insulations of the electric wires.

An exposed portion of the conductors that includes the splice is vulnerable to corrosion due to electrical leakage or contact of water if left as it is. For this reason, a sealing member that is made from a resin is formed on the splice in order to prevent electrical leakage and water immersion.

The conductors are bunched having narrow spaces left among them at a spot of their exposed portion excluding the splice. Thus, in forming the sealing member, the spaces also need to be filled with the resin in a convincing way.

The sealing member needs to be provided to the exposed portion of the conductors that includes the splice and also to an end portion of the bunch of the electric wires coated with the insulations that are adjacent to the exposed portion and the splice. The spaces are provided in a longitudinal direction among the electric wires, so that the sealing member needs to be provided so as to fill the spaces. If the spaces are not filled with the sealing member, water that comes in from the other end of the bunch of the electric wires could reach the splice through the spaces.

This kind of wiring harnesses are sometimes used for wiring in a site that is susceptible to water such as an engine room. In this case, the sealing members are required to be capable of filling these spaces among the electric wires in a convincing way.

PTL 1 discloses a technique for sealing a splice of a wiring harness with a thermal curing resin such as an epoxy resin. The thermal curing resin of PTL 1 is heated within a temperature span such that thermal cure develops relatively slowly, which can curb a sharp rise in viscosity caused by thermal cure. The technique disclosed in PTL 1 is capable of sufficiently filling spaces among bunched electric wires, and narrow spaces among exposed bunched conductors.

PTL 2 discloses a technique for sealing a splice of a wiring harness with a photocuring resin. In PTL 2, the splice of the wiring harness is immersed in a solution of the photocuring resin, is then picked up therefrom, and cured by irradiating the photocuring resin solution provided to the splice with light (ultraviolet light).

CITATION LIST

Patent Literature

PTL 1: JP2007-317470A
PTL 2: JP2005-347167A

SUMMARY OF INVENTION

Technical Problem

However, in the technique disclosed in PTL 1, there arises a problem that because the heating temperature is set low in order to curb a sharp rise in viscosity, a long curing time is needed, which takes time in forming a sealing member. In addition, there arises a problem that the thermal curing resin needs to be prepared by properly mixing two kinds of solutions consisting of a base compound and a curing agent, so that facilities that allow measuring, filing and application of the solutions with precision need to be prepared, which causes an increase in cost.

Using the photocuring resin as a sealing member, which is the technique disclosed in PTL 2, can reduce the curing time to a great extent depending on conditions (e.g. the curing time can be reduced to a few seconds). However, there arises a problem that the technique disclosed in PTL 2 is not capable of sealing spaces among bunched electric wires, or spaces among exposed bunched conductors in a convincing way. This is because the light to cure the photocuring resin cannot reach these spaces, and accordingly cannot sufficiently cure the photocuring resin in these spaces. Therefore, the technique disclosed in PTL 2 is not capable of forming a sealing member with which the spaces are sufficiently filled.

In addition, it is required these days to form a sealing member that has higher airtightness. To be specific, it is required to provide a sealing member with which even narrow spaces, which exist between conductors (strands) and insulations of electric wires, and are not seen as a problem conventionally, can be filled. It is also required to provide a technique for forming a sealing member, with which even these narrow spaces can be filled, on a splice in a short period of time.

Solution to Problem

In order to solve the problems described above, a method for producing a wiring harness of the present invention, wherein the wiring harness includes a bunch of electric wires including a plurality of insulated electric wires, each of which includes a conductor and an insulation with which a portion of the conductor is coated while the other portion is exposed, the bunch of electric wires including an exposed bunched portion including a splice, the exposed bunched portion defining a spot at which the exposed portions of the conductors of the insulated electric wires are bunched and connected to each other, and a coated bunched portion that defines a spot at which the coated portions of the conductors of the insulated electric wires are bunched, and a sealing member arranged to seal the exposed bunched portion and an end portion of the coated bunched portion that is adjacent to the exposed bunched portion, includes a coat formation step of forming a coat of a composition solution by providing the composition solution containing at least a photo polymerization initiator, a thermal radical polymerization initiator, a redox catalyst, and a polymerizable compound to the exposed bunched portion and the adjacent coated bunched portion, and a light irradiation step of irradiating the coat formed on the exposed bunched portion and the adjacent coated bunched portion with light to photocure the coat.

It is preferable that in the coat formation step, the composition solution is put in a transparent container, and the bunch of electric wires is placed in the composition solution in the container from an upper surface of the composition solution until the exposed bunched portion and the end portion of the adjacent coated bunched portion are immersed in the composition solution to form the coat on the exposed bunched portion and the end portion of the adjacent coated bunched portion, and in the light irradiation step, the coat is irradiated with the light from the outside of the container.

Alternatively, it is preferable that in the coat formation step, the bunch of electric wires is placed in a transparent mold, and the composition solution is put in the mold to form the coat on the exposed bunched portion and the end portion of the adjacent coated bunched portion, and in the light irradiation step, the coat is irradiated with the light from the outside of the mold.

It is preferable that the composition solution has a viscosity of 1000 mP·s or less.

It is preferable that the polymerizable compound contains a urethane acrylate oligomer, a chain acrylate monomer, either one or both of a cyclic acrylate monomer and a cyclic N-vinyl monomer, and a thiol compound.

It is preferable that the light irradiation step is performed under an inert gas atmosphere.

In another aspect of the present invention, a wiring harness of the present invention includes a bunch of electric wires including a plurality of insulated electric wires, each of which includes a conductor and an insulation with which a portion of the conductor is coated while the other portion is exposed, the bunch of electric wires including an exposed bunched portion including a splice, the exposed bunched portion defining a spot at which the exposed portions of the conductors of the insulated electric wires are bunched and connected to each other, and a coated bunched portion that defines a spot at which the coated portions of the conductors of the insulated electric wires are bunched, and a sealing member arranged to seal the exposed bunched portion, and an end portion of the coated bunched portion that is adjacent to the exposed bunched portion, wherein the sealing member includes a resin that is cured by photo polymerization and redox copolymerization.

It is preferable that the resin of the sealing member includes s a cured object of a composition solution containing a photo polymerization initiator, a thermal radical polymerization initiator, a redox catalyst, and a polymerizable compound.

It is preferable that the polymerizable compound contains a urethane acrylate oligomer, either one or both of acyclic acrylate monomer and a cyclic N-vinyl monomer, and a thiol compound.

It is preferable that the sealing member has an adhesion property of 100 N/m or more.

It is preferable that the sealing member has a degree of cure of 90% more.

In another aspect of the present invention, a method for producing a wiring harness of the present invention, wherein the wiring harness includes a bunch of electric wires including a plurality of insulated electric wires, each of which includes a conductor and an insulation with which a portion of the conductor is coated while the other portion is exposed, the bunch of electric wires including an exposed bunched portion including a splice, the exposed bunched portion defining a spot at which the exposed portions of the conductors of the insulated electric wires are bunched and connected to each other, and a coated bunched portion that defines a spot at which the coated portions of the conductors of the insulated electric wires are bunched, and a sealing member arranged to seal the exposed bunched portion and an end portion of the coated bunched portion that is adjacent to the exposed bunched portion, includes an inner coat formation step of forming an inner coat of the sealing member by providing a first composition solution containing at least a photo polymerization initiator, a thermal radical polymerization initiator, and a polymerizable compound to the exposed bunched portion and the end portion of the adjacent coated bunched portion, an outer coat formation step of forming an outer coat of the sealing member by providing a second composition solution containing at least a photo polymerization initiator, a redox catalyst, and a polymerizable compound to the inner coat, and a light irradiation step of irradiating the sealing member consisting of the inner coat and the outer coat with light to photocure the sealing member.

It is preferable that in the inner coat formation step and the outer coat formation step, the inner coat and the outer coat are formed in sequence on the exposed bunched portion and the end portion of the adjacent coated bunched portion by putting the first composition solution and the second composition solution in a transparent container such that the first composition solution is disposed at an upper level while the second composition solution is disposed at a lower level, and placing the bunch of electric wires in the composition solutions in the container from an upper surface of the composition solutions until the exposed bunched portion and the end portion of the adjacent coated bunched portion are immersed in the composition solutions, and in the light irradiation step, the coats are irradiated with the light from the outside of the container.

It is preferable that the polymerizable compound in the first composition solution contains a urethane acrylate oligomer, a chain acrylate monomer, a cyclic acrylate monomer, and a thiol compound, and the polymerizable compound in the second composition solution contains a urethane acrylate oligomer, a chain acrylate monomer, and either one or both of a cyclic acrylate monomer and a cyclic N-vinyl monomer.

It is preferable that the first composition solution has a viscosity of 10 mP·s to 1000 mP·s, and the second composition solution has a viscosity of 10 mP·s to 1000 mP·s.

It is preferable that the light irradiation step is performed under an inert gas atmosphere.

It is preferable that in the outer coat formation step, the bunch of electric wires where the inner coat is formed is placed in the second composition solution in the transparent container to form the outer coat, and in the light irradiation step, the outer coat is irradiated with light from the outside of the container.

Yet, in another aspect of the present invention, a wiring harness includes a bunch of electric wires including a plurality of insulated electric wires, each of which includes a conductor and an insulation with which a portion of the conductor is coated while the other portion is exposed, the bunch of electric wires including an exposed bunched portion including a splice, the exposed bunched portion defining a spot at which the exposed portions of the conductors of the insulated electric wires are bunched and connected to each other, and a coated bunched portion that defines a spot at which the coated portions of the conductors of the insulated electric wires are bunched, and a sealing member that includes a photocured resin, and is arranged to seal the exposed bunched portion and an end portion of the coated bunched portion that is adjacent to the exposed bunched portion, wherein the sealing member includes an inner coat with which the exposed bunched portion and the end portion of the adjacent coated bunched portion are coated, the inner coat including a resin that is cured by redox copolymerization, and an outer coat that envelops the inner coat.

It is preferable that the inner coat includes a cured object of a first composition solution containing at least a photo polymerization initiator, a thermal radical polymerization initiator and a polymerizable compound, and the outer coat includes a cured object of a second composition solution containing at least a photo polymerization initiator, a redox catalyst and a polymerizable compound.

It is preferable that the polymerizable compound in the first composition solution contains a urethane acrylate oligomer, a chain acrylate monomer, a cyclic acrylate monomer, and a thiol compound, and the polymerizable compound in the second composition solution contains a urethane acrylate oligomer, a chain acrylate monomer, and either one or both of a cyclic acrylate monomer and a cyclic N-vinyl monomer.

It is preferable that the inner coat has an adhesion property of 100 N/m or more.

It is preferable that the outer coat has a degree of cure of 90% more, and the inner coat has a degree of cure of 90% more.

The method for producing the wiring harness of the present invention can provide a wiring harness that includes a sealing member that has higher airtightness because a spot in the sealing member that light does not reach and accordingly cannot be photocured can be cured by redox copolymerization.

Having higher airtightness, the wiring harness of the present invention has especially excellent water resistance.

DESCRIPTION OF EMBODIMENTS

A detailed description of a method for producing a wiring harness of a first preferred embodiment of the present inven tion will now be provided with reference to the accompanying drawings.

[Method for Producing Wiring Harness]

First Preferred Embodiment

In the method for producing the wiring harness of the present embodiment, the wiring harness is produced by forming a sealing member on a bunch of electric wires. First, a description of the bunch of electric wires on which the sealing member is formed is provided.

Figure 1:
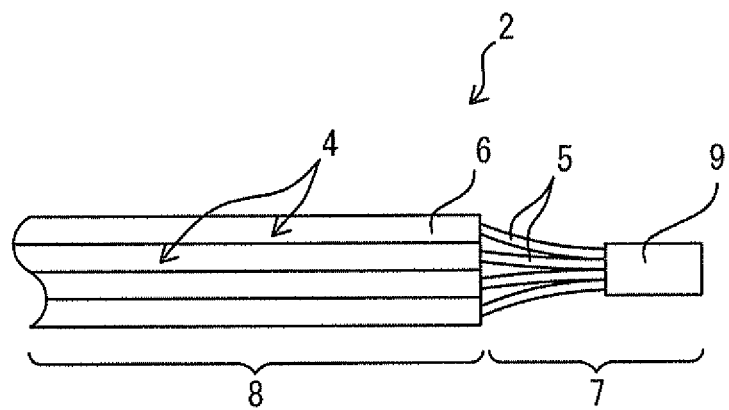
FIG. 1 is a view showing a general schematic configuration of a bunch of electric wires including a splice at its end.

FIG. 1 is a view showing a schematic configuration of a bunch of electric wires. A bunch of electric wires 2 consists of a bunch of insulated electric wires 4 as shown in FIG. 1. Known electric wires can be used as the electric wires 4 as appropriate. Each of the insulated electric wires 4 includes a conductor 5 having a linear shape, and an insulation 6 with which the conductor 5 is coated. The conductors 5 are made from a conductive material such as copper, and the insulations 6 are made from an insulating material such as polyvinyl chloride.

The conductors 5 are not coated with the insulations 6 and are exposed at end portions of the insulated electric wires 4 of the bunch of the electric wires 2. That is, the insulations 6 are provided on surfaces of the conductors 5 while not provided at the end port ions of the conductors 5 such that the end port ions are exposed.

In the present specification, a spot that corresponds to the exposed portions of the conductors 5 (the exposed conductors) of the insulated electric wires 4 of the bunch of the electric wires 2 is defined as an exposed bunched portion 7. A spot that corresponds to the portions, which are coated with the insulations 6, of the conductors 5 (the coated conductors) of the insulated electric wires 4 is defined as a coated bunched portion 8.

The exposed bunched portion 7 includes a splice 9 where the exposed end portions of the conductors 5 of the insulated electric wires 4 are connected to each other. The insulated electric wires 4 of the bunch of electric wires 2 are electrically connected to each other at the splice 9. The splice 9 is formed in a known connecting method such as crimping (melting and crimping) and welding.

The exposed conductors 5 of the insulated electric wires 4 are bunched at a spot excluding the splice 9 in the exposed bunched portion 7. Spaces exist among the bunched conductors 5.

Spaces exist among the insulated electric wires 4 in the coated bunched portion 8. These spaces are connected to the spaces among the conductors 5 in the exposed bunched portion 7.

In the method for producing the wiring harness of the present embodiment, a sealing member that is made from a resin is formed on the exposed bunched portion 7 and an end portion of the coated bunched portion 8 that is adjacent to the exposed bunched portion 7 in the bunch of electric wires 2. The sealing member of the present embodiment is arranged to seal both of the exposed bunched portion 7, and the end portion of the adjacent coated bunched portion 8.

Figure 2:
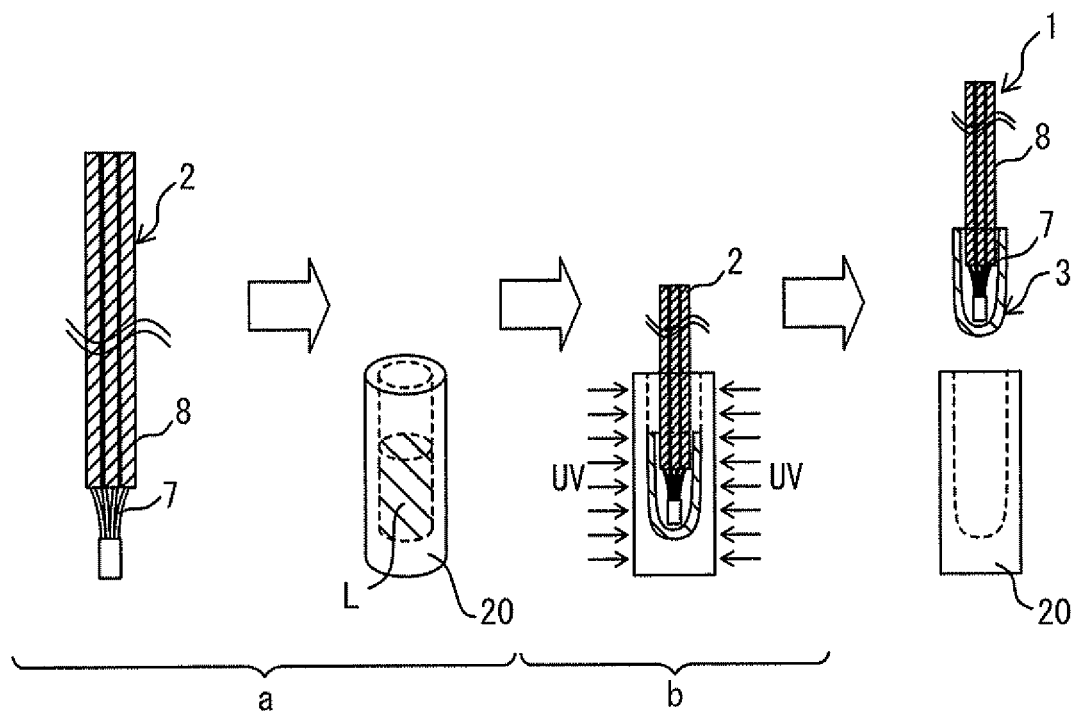
FIG. 2 is a view for schematically illustrating a method for producing a wiring harness of a first preferred embodiment of the present invention.

FIG. 2 is a view for schematically illustrating the method for producing the wiring harness of the present embodiment. The method for producing the wiring harness of the present embodiment includes a coat formation step (a), and a light irradiation step (b) as shown in FIG. 2.

<Coat Formation Step>

The coat formation step includes providing a composition solution to an exposed bunched portion and a coated bunched portion that is adjacent to the exposed bunched portion of a bunch of electric wires, and forming a coat of the composition solution thereon.

The composition solution contains a thermal radical polymerization initiator, a redox catalyst, and a photocuring resin solution that is curable by redox copolymerization. Examples of the composition solution include a composition solution that contains at least a photo polymerization initiator, a thermal radical polymerization initiator, a redox catalyst, and a polymerizable compound.

Examples of the photo polymerization initiator include a benzophenone, a benzophenone derivative such as orthobenzoic acid methyl, and 4-benzoyl-4'-methyl diphenyl sulfide, thioxanthone, a derivative of thioxanthone, (2-methyl-1-[4-(methylthio)phenyl]-2-morpholino-propane-1-one), (2,4,6-trimethyl benzoil diphenyl phosphine oxide), a benzoin derivative, benzyl dimethyl ketal, α-hydroxyalkyl-phenone, α-aminoalkyl phenone, acylphosphine oxido, monoacylphosphine oxido, bisacylphosphine oxido, acrylic phenylglyoxylic acid, diethoxy acetophenone, and a titanocene compound. Selection of the photo polymerization initiator is made as appropriate in view of curing rate and yellowing property. The photo polymerization initiator may be used singly or in combination.

Examples of the combination of the photo polymerization initiators include LUCIRIN TPO (manuf.: BASF) and IRGACURE 184 (manuf.: CIBA SPECIALTY CHEMICALS INC.), LUCIRIN TPO (manuf.: BASF) and IRGACURE 651 (manuf.: Ciba Specialty Chemicals Inc.), LUCIRIN TPO (manuf.: BASF) and IRGACURE 907 (manuf.: CIBA SPECIALTY CHEMICALS INC.), and IRGACURE 184 (manuf.: CIBA SPECIALTY CHEMICALS INC.) and IRGACURE 907 (manuf.: CIBA SPECIALTY CHEMICALS INC.).

The content of the photo polymerization initiator in the composite solution is preferably within a range of 0.5 to 5% by mass. If the content is less than 0.5% by mass, even a spot that light sufficiently reaches could not be photocured sufficiently. On the other hand, if the content is more than 5% by mass, most of the photo polymerization initiator could remain unreacted. The remaining photo polymerization initiator could be activated by heat or light to change color of the sealing member after the cure to deteriorate the physical property thereof.

Examples of the thermal radical polymerization initiator include azobisisobutyronitrile (AIBN), and peroxides such as benzoyl peroxide (BPO), lauroyl peroxide, acetyl peroxide, methyl ethyl ketone peroxide, cumene hydroperoxide, di-tert-butyl peroxide, tert-butyl perbenzoate, and cyclohexanone peroxide.

The content of the thermal radical polymerization initiator in the composite solution is preferably within a range of 0.5 to 5% by mass.

A metal compound having at least a redox action is used as the redox catalyst. Examples of the redox catalyst include a metal salt of carboxylic acid such as a metal salt of aliphatic carboxylic acid, a metal salt of aromatic carboxylic acid, and a metal salt of alicyclic carboxylic acid, and a metal chelate complex. It is preferable that the metal compound includes at least one metal selected from a group consisting of cobalt, manganese, tin, vanadium and copper.

In addition, examples of the redox catalyst include naphthenates, octenoic acid salts of the above-described metals, ester phosphates of specific ones of the above-described metals, an acetylacetonato complex of specific one of the above-described metals. Ethyl hexanoate copper (II) is an example.

Further, an organic compound such as N, N-dimethyl aniline, N,N-dimethyl-p-toluidine, indoline, quinoline, 1,2,3,4-tetrahydro-quinoline, 6-methyl-1,2,3,4-tetrahydro-quinoline, and trimethylamine are also used as the redox catalyst. The aromatic amine or the hydrazine derivative among the above described catalysts can be used together with saccharin also as co-accelerators.

The content of the redox catalyst in the composite solution is preferably within a range of 0.1 to 1% by mass.

A combination of an acrylate compound and a cyclic N-vinyl monomer is preferably used as the polymerizable compound in view of easy adjustment of resin viscosity, curing rate, degree of cure, Young's modulus, breaking elongation, and adhesion property.

A combination of a urethane acrylate oligomer and an acrylate monomer is preferably used as the acrylate compound.

Examples of the acrylate monomer include a chain acrylate monomer and a cyclic acrylate monomer. The cyclic acrylate monomer defines an acrylate monomer having a cyclic structure such as an alicyclic ring and an aromatic ring. Examples of the cyclic acrylate monomer include iso-bornyl(meth) acrylate, bornyl(meth)acrylate, tricyclodecanyl(meth)acrylate, dicyclopentanyl(meth)acrylate, and tricyclodecanyl (meth)acrylate, and (meth)acrylate having an alicyclic structure such as dicyclopentanyl(meth)acrylate benzyl (meth)acrylate, 4-butylcyclohexyl(meth)acrylate, and acryloyl morpholine. The iso-bornyl(meth)acrylate is preferably used as the cyclic acrylate monomer. IBXA (manuf.: OSAKA ORGANIC CHEMICAL INDUSTRY LTD.), and ARONIX M-111, M-113, M-114, M-117, TO-1210 (manuf.: TOAGOSEI CO., LTD.) are used as the cyclic acrylate monomer. In the present specification, the chain acrylate monomer defines a straight-chain or brunched chain acrylate monomer that does not have a cyclic structure. Examples of the chain acrylate monomer include neopentylglycol diacrylate, 3-methyl-1,5pentanediol diacrylate, 1,6-hexanediol diacrylate, 2-butyl-2-ethyl-1,3-propanediol diacrylate, 2-4-diethyl-1,5-pentanediol diacrylate, 2-methyl-1,8-octanediol diacrylate, 1,9-nonanediol diacrylate, phenoxy hexaethylene glycol acetate, hydroxypivalic acid neopentylglycol acrylate, polyethylene glycol diacrylate, polypropylene glycol diacrylate, trimethylolpropane triacrylate, ethoxylated trimethylolpropane triacrylate, and dipentaerythritol hexaacrylate.

Examples of the urethane acrylate oligomer include urethane acrylate obtained by reacting bisphenol A.ethyleneoxide adduct diol, tolylenediisocyanate, and hydroxyethyl acrylate, urethane acrylate obtained by reacting polytetramethylene glycol, tolylenediisocyanate, and hydroxyethyl acrylate, urethane acrylate obtained by reacting tolylenediisocyanate, and hydroxyethyl acrylate. The above-described oligomer may be used singly or in combination.

The acrylate compound may be used with a methacrylate compound. Examples of the methacrylate compound include di-2-methacryloxyethyl-phosphate, mono[2-(meth)acryloyloxyethyl]phosphate, mono[2-(meth)acryloyloxyethyl] diphenyl phosphate, mono[2-(meth)acryloyloxyethyl]phosphate, bis[2-(meth)acryloyloxypropyl]phosphate, tris[2-(meth)acryloyloxyethyl]phosphate, and a compound that is cited as o=P(–R1) (–R2) (–R3) in JP11-100414.

The cyclic N-vinyl monomer defines a vinyl monomer that has a cyclic structure such as an aromatic ring and an alicyclic ring, and contains nitrogen atoms. Examples of the cyclic N-vinyl monomer include N-vinyl pyrrolidone (manuf.: NIPPON SHOKUBAI CO., LTD.), N-vinylcaprolactam, vinylimidazole, and vinylpyridine.

The content of the polymerizable compound in the composition solution is determined as appropriate in view of viscosity of the composition solution.

It is preferable that the composition solution has a viscosity of 1000 mPa·s or less, preferably 500 mPa·s or less, and more preferably 100 mPa·s or less. If the viscosity of the composition solution is more than 1000 m·Ps, the composition solution sometimes has difficulty in coming in the spaces among the coated bunched portion and the spaces among the exposed bunched portion of the bunch of the electric wires from the point of view of the wetting characteristic (contact angle).

The viscosity is measured in accordance with the JIS-K7117-1D. A B-type viscometer (under the condition of 25 degrees C.) is preferably used as a measurement device.

The contact angle of the composition solution is preferably 20 degrees or less, and more preferably 10 degrees or less.

The contact angle defines a contact angle to the base material made from the copper/PVC. The contact angle is measured in accordance with the JIS-K2396. FACE (CA-X) (Manuf.: KYOWA INTERFACE SCIENCE CO., LTD) is preferably used as a measurement device.

The Young's modulus of a cured object of the composition solution is preferably 10 MPa to 1000 MPa. When the Young's modulus is within this range, the sealing member has favorable damage resistance and handleability. The Young's modulus is more preferably 100 MPa to 500 MPa. When the Young's modulus is within this range, a harmonious balance can be maintained among resistance to pressure deformation, wear resistance and flexibility.

The cured object is a film object that is obtained by applying the composition solution on a PET film using an applicator bar having a thickness of 250 μm, and irradiating the composition solution on the PET film with UV light of 1 J/cm$^2$ to cure with the use of a UV light irradiation device with a belt conveyer. The Young's modulus is measured in accordance with the JIS-K7133. A tensile strength tester (AGS) (Manuf.: SHIMAZU CORPORATION) is preferably used as a measurement device.

It is preferable that the cured object of the composition solution has an adhesion property of 100 N/m or more, and more preferably 200 N/m or more. In order to achieve such an adhesion property, polar monomers such as acrylate oligomer, a cyclic N-vinyl monomer, and the above-described cyclic acrylate monomer that have a polar radical are preferably contained in the composition solution.

In order to achieve a desirable adhesion property, it is preferable to add 0.5% by mass or more of a thiol compound, in particular a multifunctional thiol compound, in the composition solution. Examples of the thiol compound include KARENZ MT series: BD1, NR1, PE1 (Manuf.: SHOWA DEKKO K. K.), thiol manufactured by SC ORGANIC CHEMICAL CO., LTD.: TMMP (trimethylolpropane tris), PEMP (pentaerythritol tetrakis), DPMP (dipentaerythritol hexakis), and TEMPIC (tris[(3-mercaptopropionyloxy)-ethyl]-isocyanurate). Multifunctional thiol of tri- or more functional thiol is preferably used for the thiol compound. Functioning to improve an adhesion property to the metal of the conductors, and also functioning as a curing accelerator in curing a polymerizable composition, the thiol compound can improve an adhesion property to a resin for coating electric wires such as PVC electric wires because the degree of cure of the cured resin is increased. A phosphoester compound or a chelate compound may be contained as an adherence auxiliary agent to improve the adhesion property to the metal of the conductors as appropriate within a range of not impairing the properties of the polymerizable compound.

The adhesion property of the cured object is obtained by forming a resin film made from the composition solution (having a thickness of 130 μm when cured by being irradiated with UV light, or a thickness of 500 μm when cured by not being irradiated with UV light) on a base material made from copper/PVC, and subjecting the resin film formed on the base material to a peeling test at 90 degrees or a T-peeling test in accordance with the JIS-Z0237.

It is preferable that the cured object of the composition solution has a breaking elongation (%) of at least 50%, more preferably 100% or more.

The breaking elongation (%) of the cured material is measured in accordance with the JIS-K7113. A tensile strength tester (AGS) (Manuf.: SHIMAZU CORPORATION) is preferably used as a measurement device.

It is preferable that the composition solution contains an antioxidant, a coloring agent, an ultraviolet absorber, a light stabilizer, a silane or titanate coupling agent, a curing accelerator, an adherence auxiliary agent such as a phosphoester compound, a defoamer, a leveling agent, a surface-active agent, a preservation stabilizing agent, a polymerization inhibitor, a plasticizer, a lubricant, a filler, an antiaging agent, a wetting characteristic improving agent, a coating improving agent, and a resin, as additives as appropriate within a range of not impairing the properties of the sealing member.

In the present embodiment, provision of the composition solution is performed such that the bunch of electric wires 2 is placed in a composition solution L in a predetermined transparent container 20 (e.g., a polyvinyl chloride (PVC) cap) such that the exposed bunched portion 7 and the end portion of the adjacent coated bunched portion 8 are immersed in the composition solution as shown in FIG. 2.

In this manner, the coat of the composition solution is formed on the exposed bunched portion 7 and the end portion of the adjacent coated bunched portion 8.

<Light Irradiation Step>

The light irradiation step defines a step of irradiating the exposed bunched portion 7 and the end portion of the adjacent coated bunched portion 8 of the bunch of electric wires 2 with light to photocure the coat.

In the present embodiment, the bunch of electric wires 2, which is immersed in the composition solution in the coat formation step, is irradiated with light such as ultraviolet light from the outside of the container. The transparent container defines a mold to form the sealing member. The cure of the sealing member is completed in the mold.

The kind (wavelength) of the irradiating light is selected as appropriate depending on the kind of the initiator to be used. For example, ultraviolet light is irradiated.

The means to irradiate the light in the light irradiation step is not limited specifically, and is selected as appropriate depending on the intended use. For example, a known light irradiation device such as a mercury lamp and a metal halide lamp can be used. It is preferable to collect light emitted from the light irradiation device with the use of a reflection mirror to irradiate the sealing member of the bunch of electric wires with the collected light. It is also preferable to irradiate the sealing member of the bunch of electric wires with light that is almost uniform by using a spot light irradiation device (e.g., a UV spot light irradiation device).

The composition solution that fills spaces among the electric wires in the coated bunched portion, and spaces among the conductors in the exposed bunched portion that the light does not reach (does not reach easily) is cured by the redox copolymerization.

In the present embodiment, the redox copolymerization can be started before the photocuring; however, almost all spots that the light reaches are photocured because the rate of the redox copolymerization is sufficiently slower than the photocuring rate.

In the present embodiment, a few seconds of light irradiation duration is sufficient even the coat has a thickness of about a few millimeters only if the curing rate of the resin is relatively fast and the ultraviolet light to be irradiated has a light level of 250 mW/cm$^2$ or more.

It is preferable that the light irradiation step is performed under an inert gas atmosphere. Examples of the inert gas include nitrogen and argon. The light irradiation step performed under the inert gas atmosphere can prevent inhibition by oxygen of surface-curing by the photocuring, and can prevent inhibition of surface-curing by the redox copolymerization.

After the completion of the light irradiation step, the bunch of electric wires is pulled out and separated from the transparent container, and thus the sealing member is formed on the bunch of electric wires as shown in FIG. 2. The transparent container is preferably made from a polyethylene or fluorine resin that has a high ultraviolet transmittance and a mold release property.

In this manner, the wiring harness is produced, of which the end portion of the bunch of electric wires is provided with the sealing member.

Figure 3:
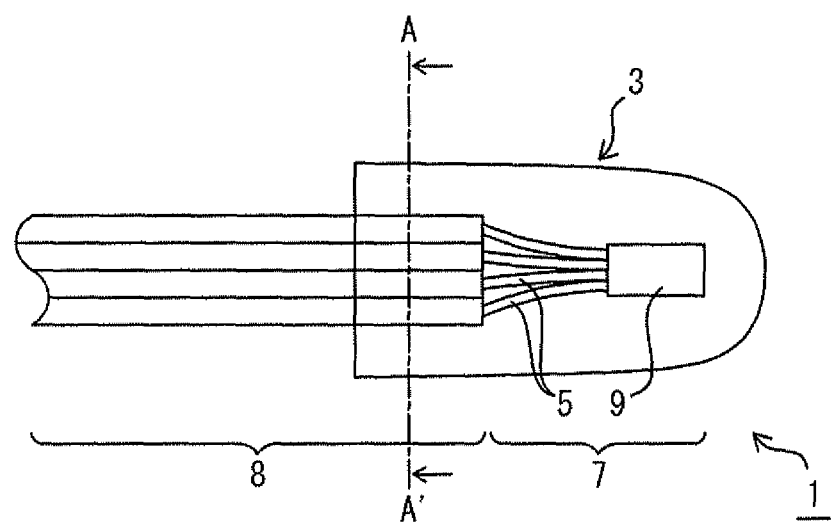
FIG. 3 is a view showing a schematic configuration of the wiring harness of the embodiment.
Figure 4:
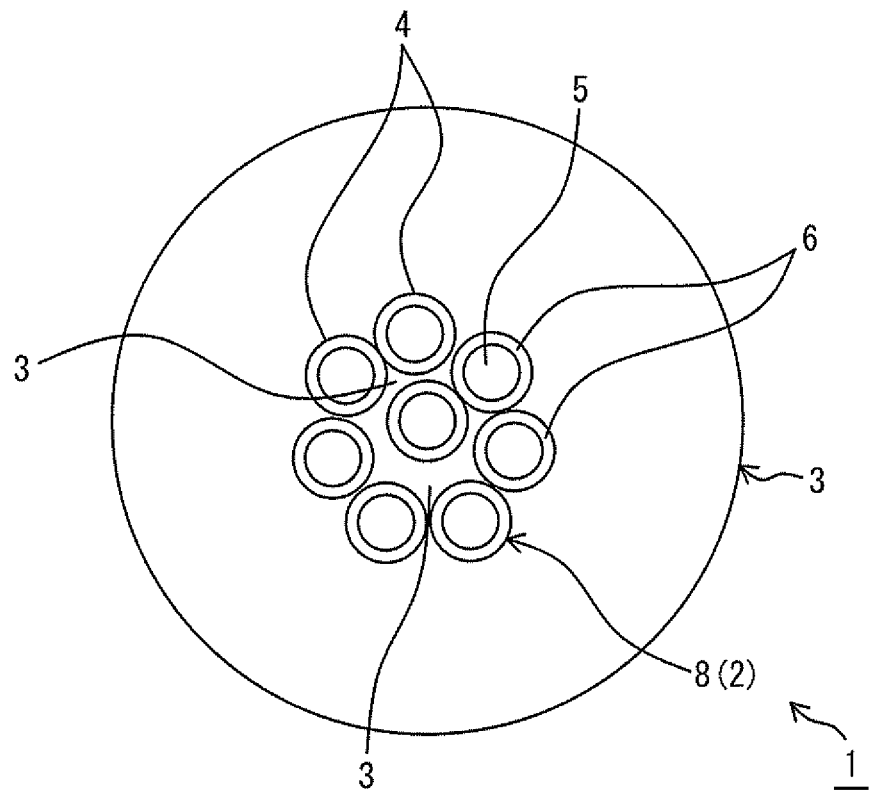
FIG. 4 is a cross-sectional view showing the same along the line A-A' of FIG. 3.

FIG. 3 is a view showing a schematic configuration of a wiring harness 1 that is produced in the method for producing the wiring harness of the present embodiment. FIG. 4 is a cross-sectional view showing the same along the line A-A' of FIG. 3.

The wiring harness 1 includes the bunch of electric wires 2 and the sealing member 3 as shown in FIG. 4.

The sealing member 3 consists of the resin that is cured by the photo polymerization, and the resin cured by redox copolymerization. In the resins of which the sealing member 3 consists of, the spot that the light necessary for curing reaches from the outside is cured by the photo polymerization, and the spot that the light does not reach (does not reach easily) from the outside such as the spaces among the conductors 5 in the exposed bunched portion 7 and the spaces among the insulated electric wires 4 in the coated bunched portion 8 are cured by the redox copolymerization.

Next, a detailed description of a method for producing a wiring harness of a second preferred embodiment of the present invention will be provided.

Second Preferred Embodiment

Figure 5:
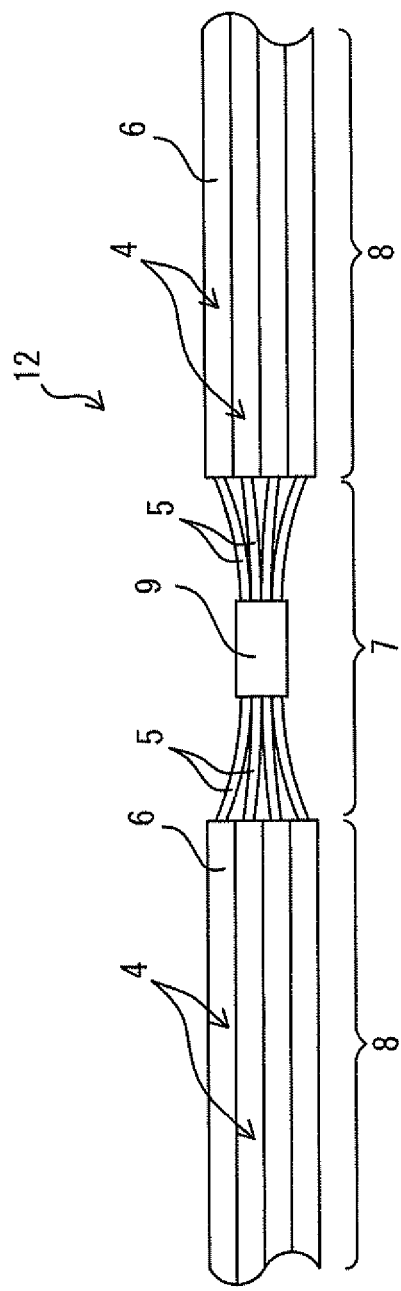
FIG. 5 is a view showing a general schematic configuration of a bunch of electric wires including a splice at its intermediate portion.

The method for producing the wiring harness of the second preferred embodiment differs in the shape of the bunch of electric wires 12 to which the sealing member 3 is provided. The bunch of electric wires 12 includes the splice 9 at its intermediate portion. FIG. 5 is a view showing a schematic configuration of the bunch of electric wires 12 including the splice 9 at its intermediate portion.

The conductors 5 are not coated with the insulations 6 and are exposed at the intermediate portions of the insulated electric wires 4 of the bunch of electric wires 12 as shown in FIG. 5. That is, the insulations 6 are formed on the conductors 5 such that the conductors 5 are exposed at their intermediate portions. The splice 9 is formed by connecting the conductors 5 at the exposed intermediate portions. The exposed bunched portion 7 is interposed by the two coated bunched portions 8 in the bunch of electric wires 12.

The exposed conductors 5 of the insulated electric wires 4 are bunched at a spot excluding the splice 9 in the exposed bunched portion 7. Spaces exist among the bunched conductors 5.

Spaces exist among the insulated electric wires 4 in the coated bunched portion 8. These spaces are connected to the spaces among the conductors 5 in the exposed bunched portion 7.

In the present embodiment, a sealing member is formed so as to coat the exposed bunched portion 7 and end portions of the two coated bunched portions 8 that are adjacent to the exposed bunched portion 7.

Figure 6:
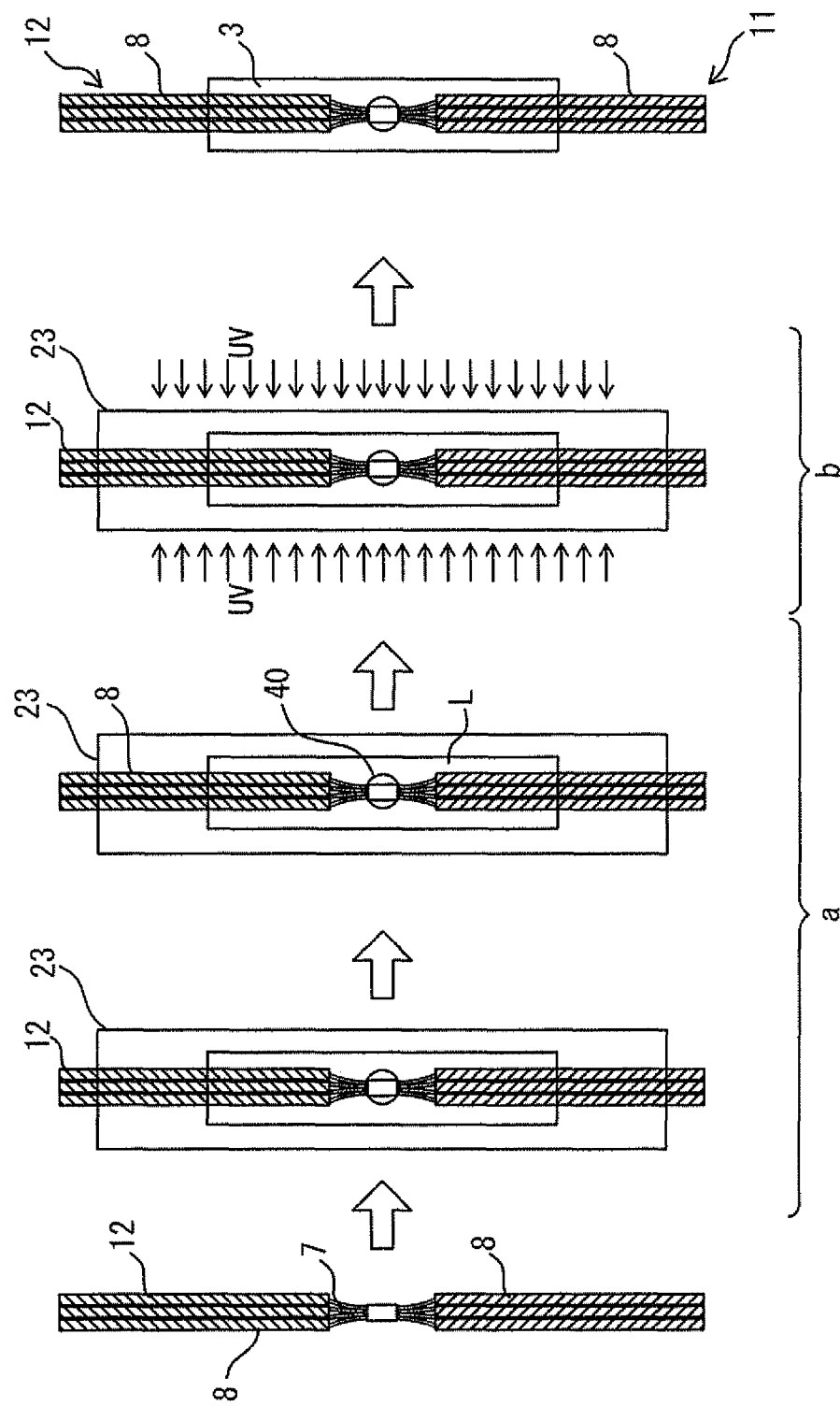
FIG. 6 is a view for schematically illustrating a method for producing a wiring harness of a second preferred embodiment of the present invention.

FIG. 6 is a view for schematically illustrating the method for producing the wiring harness of the present embodiment. The method for producing the wiring harness of the present embodiment includes a coat formation step (a) and a light irradiation step (b) similarly to the method for producing the wiring harness of the first embodiment. A composition solution same as the first embodiment is used in the present embodiment.

<Coat Formation Step>

In the coat formation step of the present embodiment, a mold (transparent mold) 23 made from a transparent material such as quartz is used to form the coat. The bunch of electric wires 12 is placed in the transparent mold 23 (in a cavity thereof) such that the exposed bunched portion 7 is disposed in the substantial center in the cavity of the transparent mold 23. After the exposed bunched portion 7 is disposed, the composition solution is poured in the cavity from an inlet 40 that communicates with the cavity. Then, the cavity is filled with the composition solution, and the exposed bunched portion 7 of the bunch of electric wires 12 is immersed in the composition solution. The size of the cavity is determined as appropriate according to the size of the sealing member to be formed on the bunch of electric wires 12. Thus, the sealing member is formed on the bunch of electric wires 12.

<Light Irradiation Step>

In the light irradiation step of the present embodiment, the bunch of electric wires 12 on which the coat is formed is irradiated with light while left in the transparent mold 23. Being irradiated with light for curing (e.g., ultraviolet light in the present embodiment) from the outside of the transparent mold 23, the coat on the bunch of electric wires 12 is cured. It is preferable that the light irradiation step is performed under an inert gas atmosphere.

After the completion of the light irradiation step, the bunch of electric wires 12 is pulled out of the transparent mold 23, and thus a wiring harness 11 is produced, of which the intermediate portion of the bunch of electric wires 12 is provided with the sealing member 3 as shown in FIG. 6.

Figure 7:
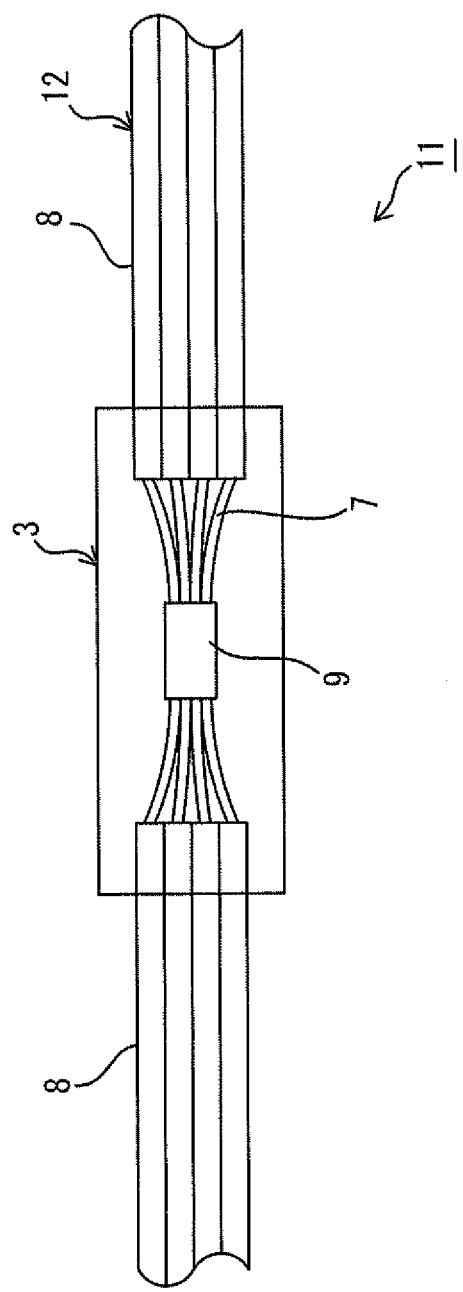
FIG. 7 is a view showing a schematic configuration of the wiring harness of the embodiment.

FIG. 7 is a view showing a schematic configuration of the wiring harness 11 that is produced in the method for producing the wiring harness of the present embodiment. In the wiring harness 11, the exposed bunched portion 7 that includes the splice 9 at the intermediate portion of the bunch of electric wires 12, and the end portions of the two coated bunched portions 8 that are adjacent to the exposed bunched portion 7 are coated with the sealing member 3 as shown in FIG. 7.

EXAMPLE

A description of the present invention will now be specifically provided with reference to Examples. It is to be noted that the present invention is not limited to Examples.

Example 1

<Preparation of Composition Solution>

First, a solution A and a solution B that were necessary to prepare the composition solution was prepared under composition conditions as below. The density of the solution A was almost equal to that of the solution B.

(Solution A)

2,4,6-trimethyl benzoil diphenyl phosphine oxide (photo polymerization initiator) [manuf.: BASF, LUCIRIN TPO], 2 parts by mass Bis-(2,6-dimethoxybenzoyl)-2,4,4-trimethylpentylphosphine oxide (photo polymerization initiator) [manuf.: CIBA SPECIALTY CHEMICALS INC., IRGACURE 184], 1 part by mass Cumene hydroperoxide (thermal radical polymerization initiator) [manuf.: KAYAKUAKUZO CO., LTD., KAYAKUMEN], 1 part by mass Urethane acrylate oligomer (polymerizable compound) [manuf.: JSR CORPORATION], 40 parts by mass Acrylate monomer (chain polymerizable compound), 50 parts by mass Iso-bornyl acrylate monomer (cyclic polymerizable compound) [manuf.: NIPPON SHOKUBAI CO., LTD.], 15 parts by mass Thiol compound (adherence auxiliary agent/curing accelerator): TMMP [manuf.: SAKAI CHEMICAL INDUSTRY CO., LTD.] 1 part by mass Ethylenebis(oxyethylene)bis[3-(5-tert-butyl-4-hydroxy-m-tolyl)] propionate (antioxidant) [manuf.: CIBA SPECIALTY CHEMICALS INC., IRGANOX 245], 0.3 parts by mass The solution A had a viscosity of 240 mPa·s at 25 degrees C.

(Solution B)

2,4,6-trimethyl benzoil diphenyl phosphine oxide (photo polymerization initiator) [manuf.: BASF, LUCIRIN TPO], 2 parts by mass Bis-(2,6-dimethoxybenzoyl)-2,4,4-trimethylpentylphosphine oxide (photo polymerization initiator) [manuf.: CIBA SPECIALTY CHEMICALS INC., IRGACURE 184], 1 part by mass Ethyl hexanoate copper (II) (redox catalyst), 0.1 part by mass Urethane acrylate oligomer (polymerizable compound) [manuf.: JSR CORPORATION], 40 parts by mass Acrylate monomer (chain polymerizable compound), 35 parts by mass N-vinyl pyrrolidone (cyclic polymerizable compound) [manuf.: NIPPON SHOKUBAI CO., LTD.], 30 parts by mass Ethylenebis(oxyethylene)bis[3-(5-tert-butyl-4-hydroxy-m-tolyl)]propionate (antioxidant) [manuf.: CIBA SPECIALTY CHEMICALS INC., IRGANOX 245], 0.3 parts by mass The solution B had a viscosity of 120 mPa·s at 25 degrees C.

The solution A and the solution B were mixed at a mass ratio of 1 to 1 with the use of a static mixer, and the composition solution was thus obtained.

<Bunch of Electric Wires Including a Splice at Its End>

A bunch of electric wires including a splice at its end was prepared, the electric wires being made up of nine PVC electric wires each having an outer diameter of 1.8 mm (each conductor of the PVC electric wires had a diameter of 0.24 mm, and consisted of nineteen copper strands).

<Coat Formation Step>

1 ml of the composition solution was poured in a transparent container made from polyethylene (a mold 8 mm in diameter). The bunch of electric wires was placed in the composition solution in the container from its exposed bunched portion such that 10 mm or more of the end portion of the coated bunched portion was immersed in the composition solution.

<Light Irradiation Step>

The bunch of electric wires immersed in the composition solution as described above was irradiated with light with the use of a UV light irradiation device of 800 watts (power 80 W/cm lamp length) including a metal halide lamp and a collection cold mirror (manuf.: ORC MANUFACTURING CO., LTD.), and the composition solution was photocured by ultraviolet light.

After left at room temperature, the bunch of electric wires was separated from the transparent container. Thus, a wiring harness was obtained, which included a sealing member that enveloped the exposed bunched portion and the end portion of 10 mm long of the coated bunched portion.

<Waterproof Performance Test>

Figure 8:
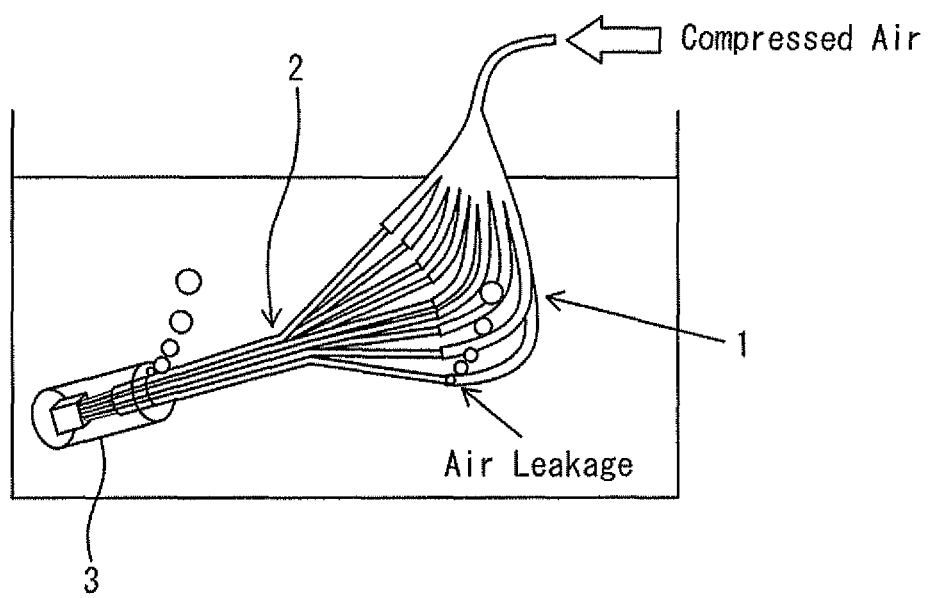
FIG. 8 is a view for illustrating a waterproof performance test for a wiring harness.

FIG. 8 is a view for illustrating a waterproof performance test for a wiring harness. The obtained wiring harness was placed in water such that an end port ion with the sealing member of the wiring harness sank under water as shown in FIG. 8. Then, 200 kPa of compressed air was injected into each of the electric wires from the other end portion of the wiring harness. A check for air leakage from the sealing member and from the ends of the electric wires into which the compressed air was not injected and left free was made with eyes for one minute.

As a result, concerning the wiring harness of Example 1, air leakage from the sealing member (at a contact portion between the bunch of electric wires and the sealing member) and from the ends of the electric wires into which the compressed air was not injected and left free was not found.

<Measurement of Degree of Cure>

The degree of cure of the sealing member of the wiring harness of Example 1 was obtained with the use of FT-IR.

The degree of cure of the sealing member (the degree of cure of an inner coat of the sealing member) was obtained as follows.

In the composition yet to be cured, an absorption peak of methylene group at 2900 $cm^{-1}$, which does not change with the degree of cure, was set as a base peak, and the area of the base peak was set as an area Ac. Meanwhile, the area of a peak of acrylic group at 810 $cm^{-1}$, which changes with the degree of cure, was set as an area Aa. The area ratio of these areas in the composition solution that was yet to be cured was set as Aa/Ac=RL (0% degree of cure).

The area ratio of a cured film, which was prepared by irradiating a first composition solution with UV light of 500 mJ/$cm^2$ (under a nitrogen atmosphere) so as to have a film thickness of 130 μm, was set as Aa/Ac=Rc (100% degree of cure).

A degree of cure Ds of a desired spot was obtained by the following equation as a ratio of two peak areas at this spot, Aa/Ac=Rs.

$$Ds=\{(Rs-RL)/(RL-Re)\}\times 100(\%)$$

As a result, in the sealing member, the degree of cure of the spot that the UV light reached was 98%, and the degree of cure of the sealing member among the electric wires that defined the spot that the UV light did not reach was 95%.

In this manner, it was found that the degree of cure of the spot that the UV light did not reach was close to the degree of cure of the spot that the UV light reached, and thus the degree of cure of the spot that the UV light did not reach was high.

Comparative Example 1

A wiring harness was produced by providing a sealing member to a bunch of electric wires including a splice at its end in the same manner as Example 1, except that only 1 ml of the composition solution (Solution B) of Example 1 is used instead of the composition solution of Example 1.

The wiring harness of Comparative Example 1 was subjected to a waterproof performance test similar to Example 1. As a result, air leakage from insulated electric wires of the wiring harness (leakage between wires) and air leakage from a spot between PVC electric wires and the resin (sealing member leakage) occurred.

Then, the sealing member of the wiring harness in which the air leakage occurred was cut to observe its cross-section. As a result, it was found that spaces existed among PVC electric wires in a coated bunched portion and among elemental wires of conductors in the PVC electric wires. It was found that the composition solution was uncured among the PVC electric wires and the elemental wires of the conductors in the electric wires of Comparative Example 1.

Example 2

<Bunch of Electric Wires Including a Splice at its Intermediate Portion>

Five PVC electric wires each having an outer diameter of 1.8 mm were prepared, and insulations at the intermediate portions of the electric wires were removed. Then, the exposed conductors were connected to each other by crimping to form a splice. Thus, the bunch of electric wires including the splice at its intermediate portion was prepared.

<Preparation of Composition Solution (Solution A and Solution B)>

A solution A and a solution B having compositions same as Example 1 were used.

<Coat Formation Step>

The bunch of electric wires was placed in a mold (8 mm in diameter×40 mm long) made from quartz that was thinly coated with a fluorinated mold release agent such that an exposed bunched portion of the bunch of electric wires and end portions of two coated bunched portions that are adjacent to the exposed bunched portion fit into the mold. Then, while being mixed at the ratio of 1 to 1 (mass ratio) with the use of a static mixer, the solution A and the solution B were poured in the mold. Fluorinated sealing rubber was inserted into both ends of the mold such that the resin did not come out from the spaces between the electric wires.

Then, the bunch of electric wires while left in the mold was disposed on a collecting portion (focal area) of a UV light irradiation device including a metal halide lamp (800 watts, power 80 W/cm lamp length) and a collection cold mirror that surrounds the metal halide lamp (manuf.: ORC MANUFACTURING CO., LTD.). The bunch of electric wires in the mold was left as it was to be irradiated for 5 seconds with ultraviolet light. Thus, the composition solution was photocured by ultraviolet light.

Then, the bunch of electric wires was pulled out of the UV light irradiation device and separated from the mold. Thus, a wiring harness was obtained, which includes a sealing member that envelopes the exposed bunched portion and the end portions of the two coated bunched portions.

The obtained wiring harness was placed in water such that the sealing member at the intermediate portion sank under water. Then, 200 kPa of compressed air was injected into the wiring harness from both the ends. A check for air leakage from the sealing member was made with eyes for one minute.

As a result, concerning the wiring harness of Example 2, air leakage from the sealing member (at a contact portion between the bunch of electric wires and the sealing member) was not found.

<Measurement of Degree of Cure>

The degree of cure of the resin existing among the insulated electric wires 4 in the coated bunched portion 8, and the degree of cure of the resin existing among the conductors 5 in the exposed bunched portion 7 of the wiring harness of Example 2 were obtained with the use of FT-IR in the same manner as Example 1. As a result, in the sealing member, the degree of cure of the spot that the UV light reached was 98%, and the degree of cure of the resin existing among the electric wires that defined the spot that the UV light did not reach was 94%.

In this manner, it was found that the degree of cure of the spot that the UV light did not reach was close to the degree of cure of the spot that the UV light reached, and thus the degree of cure of the spot that the UV light did not reach was high.

Next, a detailed description of a method for producing a wiring harness of a third preferred embodiment of the present invention will now be provided with reference to the accompanying drawings.

In the method for producing the wiring harness of the present embodiment, a sealing member made from a resin is formed on the exposed bunched portion 7 and the end portion of the adjacent coated bunched portion 8 of the bunch of electric wires 2. The sealing member formed in the present embodiment includes an inner coat arranged to seal the exposed bunched portion 7 and the end portion of the adjacent coated bunched portion 8, and an outer coat that envelops the inner coat.

Figure 9:
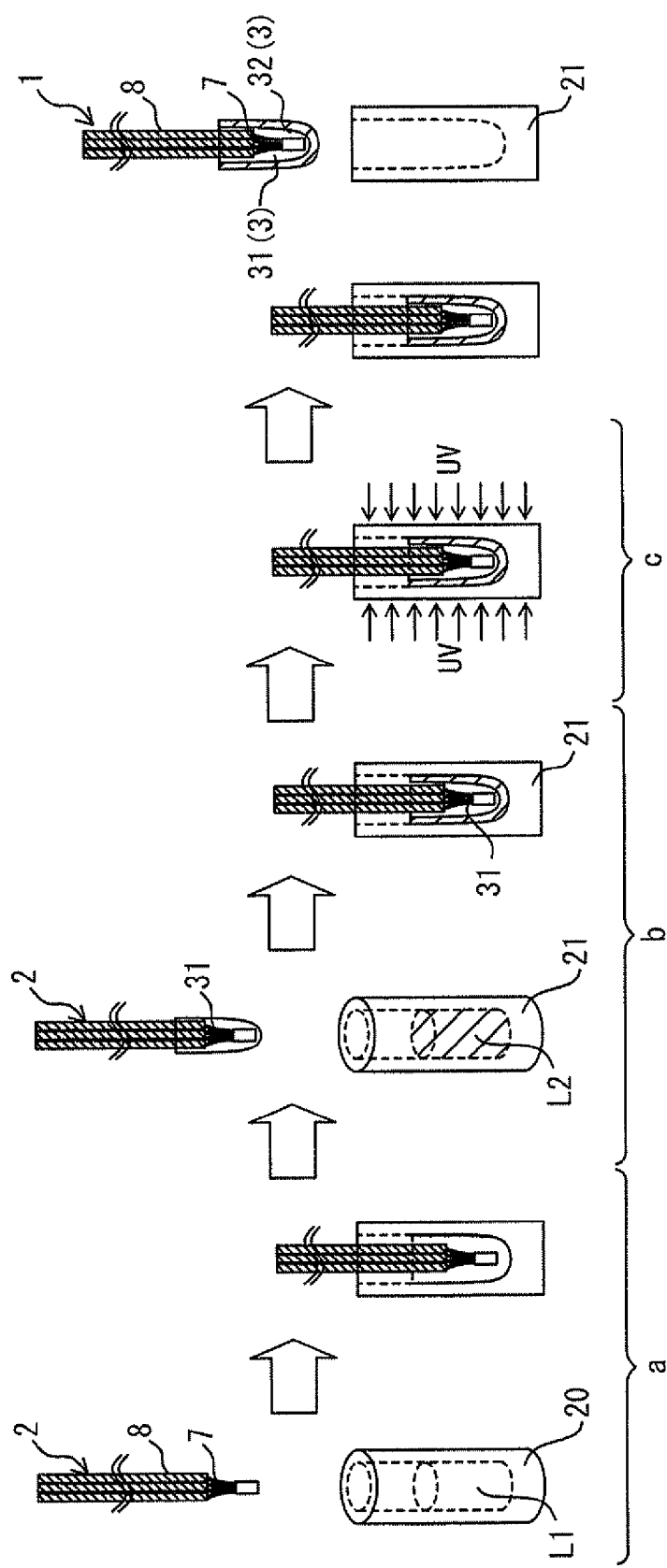
FIG. 9 is a view for schematically illustrating a method for producing a wiring harness of a third preferred embodiment of the present invention.

FIG. 9 is a view for schematically illustrating the method for producing the wiring harness of the present embodiment. The method for producing the wiring harness of the present embodiment includes an inner coat formation step (a), an outer coat formation step (b), and a light irradiation step (c) as shown in FIG. 9.

<Inner Coat Formation Step>

In the inner coat formation step, the inner coat is formed by providing a first composition solution to the exposed bunched portion 7 and the end portion of the adjacent coated bunched portion 8 of the bunch of electric wires 2.

The first composition solution (primer) contains a thermal radical polymerization initiator that reacts with a redox catalyst to produce radicals, and photocuring resin solution that is curable by redox copolymerization. Examples of the first composition solution include a composition solution that contains at least a photo polymerization initiator, a thermal radical polymerization initiator, and a polymerizable compound.

Examples of the photo polymerization initiator include a benzophenone, a benzophenone derivative such as orthobenzoic acid methyl, and 4-benzoyl-4'-methyl diphenyl sulfide, thioxanthone, a derivative of thioxanthone, (2-methyl-1-[4-(methylthio)phenyl]-2-morpholino-propane-1-one), (2,4,6-trimethyl benzoil diphenyl phosphine oxide), a benzoin derivative, benzyl dimethyl ketal, α-hydroxyalkyl-phenone, α-aminoalkyl phenone, acylphosphine oxido, monoacylphosphine oxido, bisacyiphosphine oxido, acrylic phenylglyoxylic acid, diethoxy acetophenone, and a titanocene compound, which are same as the first embodiment. Selection of the photo polymerization initiator is made as appropriate in view of curing rate and yellowing property. The photo polymerization initiator may be used singly or in combination.

Examples of the combination of the photo polymerization initiators include LUCIRIN TPO (manuf.: BASF) and IRGACURE 184 (manuf.: CIBA SPECIALTY CHEMICALS INC.), LUCIRIN TPO (manuf.: BASF) and IRGACURE 651 (manuf.: Ciba Specialty Chemicals Inc.), LUCIRIN TPO (manuf.: BASF) and IRGACURE 907 (manuf.: CIBA SPECIALTY CHEMICALS INC.), and IRGACURE 184 (manuf.: CIBA SPECIALTY CHEMICALS INC.) and IRGACURE 907 (manuf.: CIBA SPECIALTY CHEMICALS INC.).

The content of the photo polymerization initiator in the first composite solution is preferably within a range of 0.5 to 5% by mass. If the content is less than 0.5% by mass, even a spot that light sufficiently reaches could not be photocured sufficiently. On the other hand, if the content is more than 5% by mass, most of the photo polymerization initiator could remain unreacted. The remaining photo polymerization initiator could be activated by heat or light to change color of the sealing member after the cure to deteriorate the physical property thereof.

Examples of the thermal radical polymerization initiator include azobisisobutyronitrile (AIEN), and peroxides such as benzoyl peroxide (SPO), lauroyl peroxide, acetyl peroxide, methyl ethyl ketone peroxide, cumene hydroperoxide, di-tert-butyl peroxide, tert-butyl perbenzoate, and cyclohexanone peroxide, which are same as the first embodiment.

The content of the thermal radical polymerization initiator in the first composite solution is preferably within a range of 0.5 to 5% by mass.

An acrylate compound is preferably used as the polymerizable compound in view of easy adjustment of resin viscosity, curing rate, degree of cure, Young's modulus, and breaking elongation. A combination of a urethane acrylate oligomer and an acrylate monomer is preferably used as the acrylate compound.

Examples of the urethane acrylate oligomer include urethane acrylate obtained by reacting bisphenol A.ethyleneoxide adduct diol, tolylene diisocyanate, and hydroxyethyl acrylate, urethane acrylate obtained by reacting polytetramethylene glycol, tolylenediisocyanate, and hydroxyethyl acrylate, urethane acrylate obtained by reacting tolylenediisocyanate, and hydroxyethyl acrylate, which are same as the first embodiment. The above-described oligomer may be used singly or in combination.

Examples of the acrylate monomer include a chain acrylate monomer and a cyclic acrylate monomer. The cyclic acrylate monomer defines an acrylate monomer having a cyclic structure such as an alicyclic ring and an aromatic ring. Examples of the cyclic acrylate monomer include iso-bornyl(meth)acrylate, bornyl(meth)acrylate, tricyclodecanyl(meth)acrylate, dicyclopentanyl(meth)acrylate, and tricyclodecanyl(meth)acrylate, and (meth)acrylate having an alicyclic structure such as dicyclopentanyl(meth)acrylate, benzyl (meth)acrylate, 4-butylcyclohexyl(meth)acrylate, and acryloyl morpholine. The iso-bornyl(meth)acrylate is preferably used as the cyclic acrylate monomer. IBXA (OSAKA ORGANIC CHEMICAL INDUSTRY LTD.), and ARONIX M111, M-113, M-114, M-117, TO-1210 (TOAGOSEI CO., LTD.) are used as the cyclic acrylate monomer. In the present specification, the chain acrylate monomer defines a straight-chain or brunched chain acrylate monomer that does not have a cyclic structure. Examples of the straight-chain acrylate monomer include neopentylglycol diacrylate, 3-methyl-1,5 pentanediol diacrylate, 1,6-hexanediol diacrylate, 2-butyl-2-ethyl-1,3-propanediol diacrylate, 2-4-diethyl-1,5-pentanediol diacrylate, 2-methyl-1,8-octanediol diacrylate, 1,9-nonanediol diacrylate, phenoxy hexaethylene glycol acetate, hydroxypivalic acid neopentylglycol acrylate, polyethylene glycol diacrylate, polypropylene glycol diacrylate, trimethylolpropane triacrylate, ethoxylated trimethylolpropane triacrylate, and dipentaerythritol hexaacrylate.

The acrylate compound may be used with a methacrylate compound. Examples of the methacrylate compound include di-2-methacryloxyethyl-phosphate, mono[2-(meth)acryloyloxyethyl]phosphate, mono[2-(meth)acryloyloxyethyl] diphenyl phosphate, mono[2-(meth)acryloyloxyethyl]phosphate, bis[2-(meth)acryloyloxypropyl]phosphate, tris[2-(meth)acryloyloxyethyl]phosphate, and a compound that is cited as o=P(–R1) (–R2) (–R3) in JP11-100414.

It is preferable that other polymerizable compounds are used as appropriate within a range of not impairing the properties of the sealing member.

The content of the polymerizable compounds in the first composition solution is determined as appropriate in view of viscosity of the composition solution.

It is preferable that the first composition solution has a viscosity (at room temperature) of 1000 mPa·s or less, preferably 500 mPa·s or less, and more preferably 100 mPa·s or less.

The viscosity is measured in accordance with the JIS-K7117-1D. A B-type viscometer (under the condition of 25 degrees C.) is preferably used as a measurement device.

The contact angle of the first composition solution is preferably 20 degrees or less, and more preferably 10 degrees or less.

The contact angle defines a contact angle to the base material made from the copper/PVC. The contact angle is measured in accordance with the JIS-K2396. FACE (CA-X) (Manuf.: KYOWA INTERFACE SCIENCE CO., LTD) is preferably used as a measurement device.

The Young's modulus of a cured object of the first composition solution is preferably 10 MPa to 1000 MPa. When the Young's modulus is within this range, the sealing member has favorable damage resistance and handleability. The Young's modulus is more preferably 100 MPa to 500 MPa. When the Young's modulus is within this range, a harmonious balance can be maintained among resistance to pressure deformation, wear resistance and flexibility.

The cured object is a film object that is obtained by applying the first composition solution on a PET film using an applicator bar having a thickness of 250 μm, and irradiating the material on the PET film with UV light of 1 J/cm$^2$ to cure with the use of a UV light irradiation device with a belt conveyer. The Young's modulus is measured in accordance with the JIS-K7133. A tensile strength tester (AGS) (Manuf.: SHIMAZU CORPORATION) is preferably used as a measurement device.

It is preferable that the cured object of the first composition solution (inner coat) has an adhesion property of 100 N/m or more, and more preferably 200 N/m or more. In order to achieve such an adhesion property, polar monomers such as acrylate oligomer and the above-described cyclic acrylate monomer that have a polar radical are preferably contained in the composition solution.

In order to achieve a desirable adhesion property, it is preferable to add 0.5% by mass of a thiol compound, in particular a multifunctional thiol compound, in the first composition solution. Examples of the thiol compound include KARENZ MT series: BD1, NR1, PE1 (Manuf.: SHOWA DENKO K.K.) thiol manufactured by SC ORGANIC CHEMICAL CO., LTD.: TMMP (trimethylolpropane tris), PEMP (pentaerythritol tetrakis), DPMP (dipentaerythritol hexakis), and TEMPIC (tris[(3-mercaptopropionyloxy)-ethyl]-isocyanurate). Multifunctional thiol of tri- or more-functional thiol is preferably used for the thiol compound. Functioning to improve the adhesion property to the metal of the conductors, and also functioning as a curing accelerator in curing a polymerizable composition, the thiol compound can improve the adhesion property to a resin for coating electric wires such as PVC electric wires because the degree of cure of the cured resin is increased. A phosphoester compound or a chelate compound may be contained as an adherence auxiliary agent to improve the adhesion property to the metal of the conductors as appropriate within a range of not impairing the properties of the polymerizable compound.

The adhesion property of the cured object is obtained by forming a resin having a thickness of 500 μm and made from the composition solution on a base material made from copper/PVC, curing the resin to make a resin film, and subjecting the resin film to a peeling test at 90 degrees or a T-peeling test in accordance with the JIS-Z0237.

It is preferable that the cured object of the first composition solution has a breaking elongation (%) of at least 50%, more preferably 100% or more.

The breaking elongation (%) of the cured object is measured in accordance with the JIS-K7113. A tensile strength tester (AGS) (Manuf.: SHIMAZU CORPORATION) is preferably used as a measurement device.

It is preferable that the composition solution contains an antioxidant, a coloring agent, an ultraviolet absorber, a light stabilizer, a silane or titanate coupling agent, a defoamer, a curing accelerator, an adherence auxiliary agent such as a thiol compound and a phosphoester compound, a leveling agent, a surface-active agent, a preservation stabilizing agent, a polymerization inhibitor, a plasticizer, a lubricant, a filler, an antiaging agent, a wetting characteristic improving agent, a coating improving agent, and a resin, as additives as appropriate within a range of not impairing the properties of the sealing member.

In the present embodiment, provision of the first composition solution is performed such that the bunch of electric wires 2 is placed in a first composition solution L1 in the predetermined transparent container 20 (e.g., a PVC cap) such that the exposed bunched portion 7 and the end portion of the adjacent coated bunched portion 8 are immersed in the first composition solution L1 as shown in FIG. 9. It is preferable that an immersion time is long enough to sufficiently provide the first composition solution to the exposed bunched portion 7 and other portions. For example, the immersion time is about 1 to 5 seconds.

In this manner, an inner coat 31 of the first composition solution is formed on the exposed bunched portion 7 and the end portion of the adjacent coated bunched portion 8. In other preferred embodiments, the inner coat 31 may be formed by spraying the first composition solution on the bunch of electric wires 2 with the use of a spray device.

The bunch of electric wires 2 on which the inner coat 31 is formed is pulled out of the container 20, and subjected to the next step.

<Outer Coat Formation Step>

In the Outer coat formation step, the outer coat is formed by providing a second composition solution L2 on the inner coat 31.

The second composition solution (base material) contains a photocuring resin solution containing a redox catalyst. Examples of the second composition solution include a composition solution that contains at least a photo polymerization initiator, a redox catalyst, and a polymerizable compound.

Photo polymerization initiators same as the ones used in the first composition solution can be used as the photo polymerization initiator in the second composition solution.

A metal compound having at least a redox action is used as the redox catalyst. Examples of the redox catalyst include a metal salt of carboxylic acid such as a metal salt of aliphatic carboxylic acid, a metal salt of aromatic carboxylic acid, and a metal salt of alicyclic carboxylic acid, and a metal chelate complex. It is preferable that the metal compound includes at least one metal selected from a group consisting of cobalt, manganese, tin, vanadium and copper.

In addition, examples of the redox catalyst include naphthenates, octenoic acid salts of the above-described metals, ester phosphates of specific ones of the above-described metals, an acetylacetonato complex of specific one of the above-described metals. Ethyl hexanoate copper (II) is an example.

Further, an organic compound such as N,N-dimethyl aniline, N,N-dimethyl-p-toluidine, indoline, quinoline, 1,2,3,4-tetrahydro-quinoline, 6-methyl-1,2,3,4-tetrahydro-quinoline, and trimethylamine are also used as the redox catalyst. The aromatic amine or the hydrazine derivative among the above described catalysts can be used together with saccharin also as co-accelerators.

The content of the redox catalyst in the second composite solution is preferably within a range of 0.1 to 1% by mass.

Polymerizable compounds same as the ones used in the first composition solution can be used as the polymerizable compound in the second composition solution. A combination of an acrylate compound and a cyclic N-vinyl monomer is preferably used as the polymerizable compound in the second composition solution in view of easy adjustment of resin viscosity, curing rate, degree of cure, Young's modulus, and breaking elongation.

A combination of a urethane acrylate oligomer and an acrylate monomer is preferably used as the acrylate compound.

Examples of the acrylate monomer include a chain acrylate monomer and a cyclic acrylate monomer. Chain acrylate monomers and cyclic acrylate monomers same as the ones used in the first composition solution can be used as the chain acrylate monomer and the cyclic acrylate monomer in the second composition solution.

It is preferable that the second composition solution has a viscosity (at room temperature) of 1000 mPa·s or less, preferably 500 mPa·s or less, and more preferably 100 mPa·s or less.

The viscosity of the second composition solution is measured in the same method as the first composition solution.

The contact angle of the second composition solution is preferably 20 degrees or less, and more preferably 10 degrees or less.

The contact angle defines a contact angle to the base material made from the copper/PVC. The contact angle is measured in accordance with the JIS-K2396. FACE (CA-X) (Manuf.: KYOWA INTERFACE SCIENCE CO., LTD) is preferably used as a measurement device.

The Young's modulus of a cured object of the second composition solution is preferably 10 MPa to 1000 MPa. When the Young's modulus is within this range, the sealing member has favorable damage resistance and handleability. The Young's modulus is more preferably 100 MPa to 500 MPa. When the Young's modulus is within this range, a harmonious balance can be maintained among resistance to pressure deformation, wear resistance and flexibility.

The cured object is a film object that is obtained by applying the second composition solution on a PET film using an applicator bar having a thickness of 250 μm, and irradiating the material on the PET film with UV light of 1 J/cm² to cure with the use of a UV light irradiation device with a belt conveyer. The Young's modulus is measured in accordance with the JIS-K7133. A tensile strength tester (AGS) (Manuf.: SHIMAZU CORPORATION) is preferably used as a measurement device.

It is preferable that the cured object of the second composition solution (outer coat) has an adhesion property of 100 N/m or more, and more preferably 200 N/m or more. In order to achieve such an adhesion property, polar monomers such as acrylate oligomer, a cyclic N-vinyl monomer, and the above-described cyclic acrylate monomer that have a polar radical are preferably contained in the composition solution.

The adhesion property of the cured object is obtained by forming a resin having a thickness of 500 μm and made from the composition solution on a base material made from copper/PVC, curing the resin to make a resin film, and subjecting the resin film to a peeling test at 90 degrees or a T-peeling test in accordance with the JIS-Z0237.

It is preferable that the cured object of the second composition solution has a breaking elongation (%) of at least 50%, more preferably 100% or more.

The breaking elongation (%) of the cured object is measured in accordance with the JIS-K7113. A tensile strength tester (AGS) (Manuf.: SHIMAZU CORPORATION) is preferably used as a measurement device.

It is preferable that the composition solution contains an antioxidant, a coloring agent, an ultraviolet absorber, a light stabilizer, a silane or titanate coupling agent, a defoamer, a curing accelerator, an adherence auxiliary agent such as a thiol compound and a phosphoester compound, a leveling agent, a surface-active agent, a preservation stabilizing agent, a polymerization inhibitor, a plasticizer, a lubricant, a filler, an antiaging agent, a wetting characteristic improving agent, a coating improving agent, and a resin, as additives as appropriate within a range of not impairing the properties of the sealing member.

In the present embodiment, provision of the second composition solution is performed such that the bunch of electric wires 2 to which the inner coat 31 is provided is placed in the second composition solution L2 in a predetermined transparent container 21 (e.g., a PVC cap) such that the whole inner coat 31 is immersed in the second composition solution 2 as shown in FIG. 9.

Immersing the whole inner coat portion in the second composition solution as described above allows the inner coat 31 made from the first composition solution to be brought into contact with the outer coat 32 made from the second composition solution in a convincing way.

An immersion time is not limited, and is determined as appropriate. In the present embodiment, the immersion time is about 1 to 5 seconds.

It is not necessary to stir to mix the second composition solution when the bunch of electric wires is immersed therein; however, the second composition solution may be stirred if desired.

In this manner, the outer coat made from the second composition solution is formed on the inner coat.

The inner coat made from the first composition solution contains the thermal radical polymerization initiator. The outer coat made from the second composition solution contains the redox catalyst. When the redox catalyst reacts with the thermal radical polymerization initiator, the thermal radical polymerization initiator produces radicals, which starts redox copolymerization.

<Light Irradiation Step>

The light irradiation step defines a step of irradiating the outer coat with light to photocure the inner coat and the outer coat formed on the exposed bunched portion of the bunch of electric wires. In the light irradiation step, the inner coat and the outer coat are cured as much as possible.

In the present embodiment, the bunch of electric wires, which is immersed in the second composition solution in the transparent container in the outer coat formation step, is irradiated with light such as ultraviolet light from the outside of the container. The transparent container defines a mold to form the sealing member. The cure of the sealing member is completed in the mold.

The kind (wavelength) of the irradiating light is selected as appropriate depending on the kind of the initiator to be used. For example, ultraviolet light is radiated.

The means to irradiate the light in the light irradiation step is not limited specifically, and is selected as appropriate depending on the intended use. For example, a known light irradiation device such as a mercury lamp and a metal halide lamp can be used. It is preferable to collect light emitted from the light irradiation device with the use of a reflection mirror to irradiate the sealing member of the bunch of electric wires with the collected light. It is also preferable to irradiate the sealing member of the bunch of electric wires with light that is almost uniform by using a spot light irradiation device (e.g., a UV spot light irradiation device).

The composition solution that fills spaces among the electric wires in the coated bunched portion, and spaces among the conductors in the exposed bunched portion that the light does not reach (does not reach easily) is cured by the redox copolymerization.

In the present embodiment, the redox copolymerization can be started before the photocuring; however, almost all spots that the light reaches are photocured because the rate of the redox copolymerization is sufficiently slower than the photocuring rate.

In the present embodiment, a few seconds of light irradiation duration is sufficient even the coat has a thickness of about a few millimeters only if the curing rate of the resin is relatively fast and the ultraviolet light to be irradiated has a light level of 250 mW/cm² or more.

It is preferable that the light irradiation step is performed under an inert gas atmosphere. Examples of the inert gas include nitrogen and argon. The light irradiation step performed under the inert gas atmosphere can prevent inhibition by oxygen of curing by the redox copolymerization.

After the completion of the light irradiation step, the bunch of electric wires is pulled out and separated from the transparent container, and thus the sealing member is formed on the bunch of electric wires as shown in FIG. 9. The transparent container is preferably made from a material having a mold release property.

In this manner, the wiring harness is produced, of which the end portion of the bunch of electric wires is provided with the sealing member.

Figure 10:
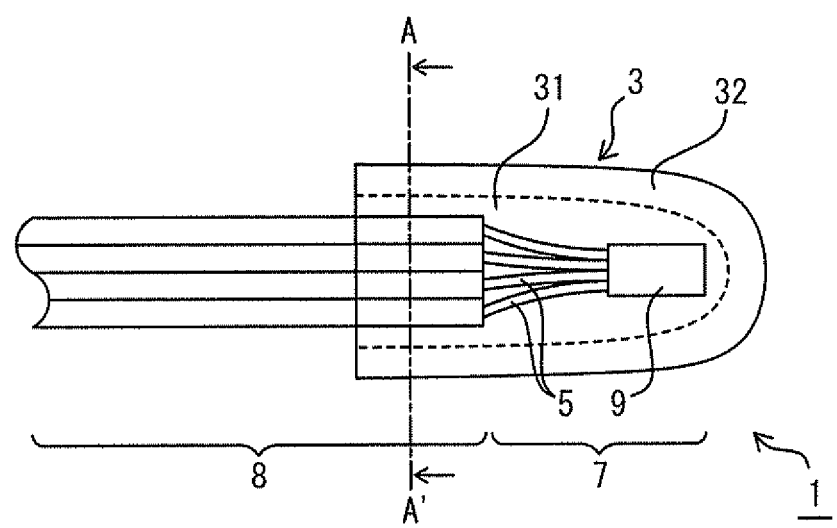
FIG. 10 is a view showing a schematic configuration of the wiring harness of the embodiment.
Figure 11:
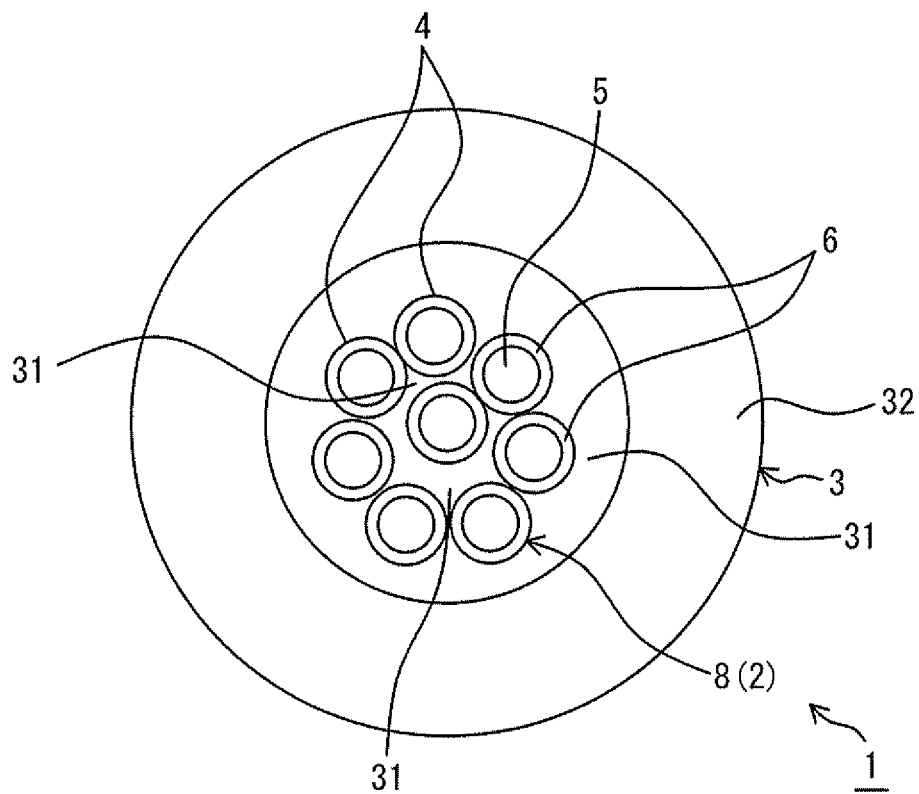
FIG. 11 is a cross-sectional view showing the same along the line A-A' of FIG. 10.

FIG. 10 is a view showing a schematic configuration of the wiring harness 1 that is produced in the method for producing the wiring harness of the third embodiment. FIG. 11 is a cross-sectional view showing the same along the line A-A' of FIG. 10.

The wiring harness 1 includes the bunch of electric wires 2 and the sealing member 3 as shown in FIG. 11.

The inner coat 31 consists of the resin that is cured by the photo polymerization, and the resin cured by redox copolymerization. In the inner coat 31, the spot that the light necessary for curing reaches from the outside such as the outer circumference of the coated bunched portion 8 and the outer circumference of the exposed bunched portion 7 is cured by the photo polymerization, and the spot that the light does not reach (does not reach easily) from the outside such as the space among the conductors 5 in the exposed bunched portion 7 is cured by the redox copolymerization.

The inner coat 31 contains a residue of the thermal radical polymerization initiator that reacts with the redox catalyst to produce radicals and starts redox copolymerization.

The outer coat 32 contains mainly the resin that is cured by the photo polymerization. The outer coat 32 is formed so as to envelope the surface of the inner coat 31. The outer coat 32 usually consists of the spot that the light necessary for curing reaches from the outside, and contains the resin that is cured by the photo polymerization.

Next, a detailed description of a method for producing a wiring harness of a fourth preferred embodiment of the present invention will be provided.

Fourth Preferred Embodiment

Figure 12:
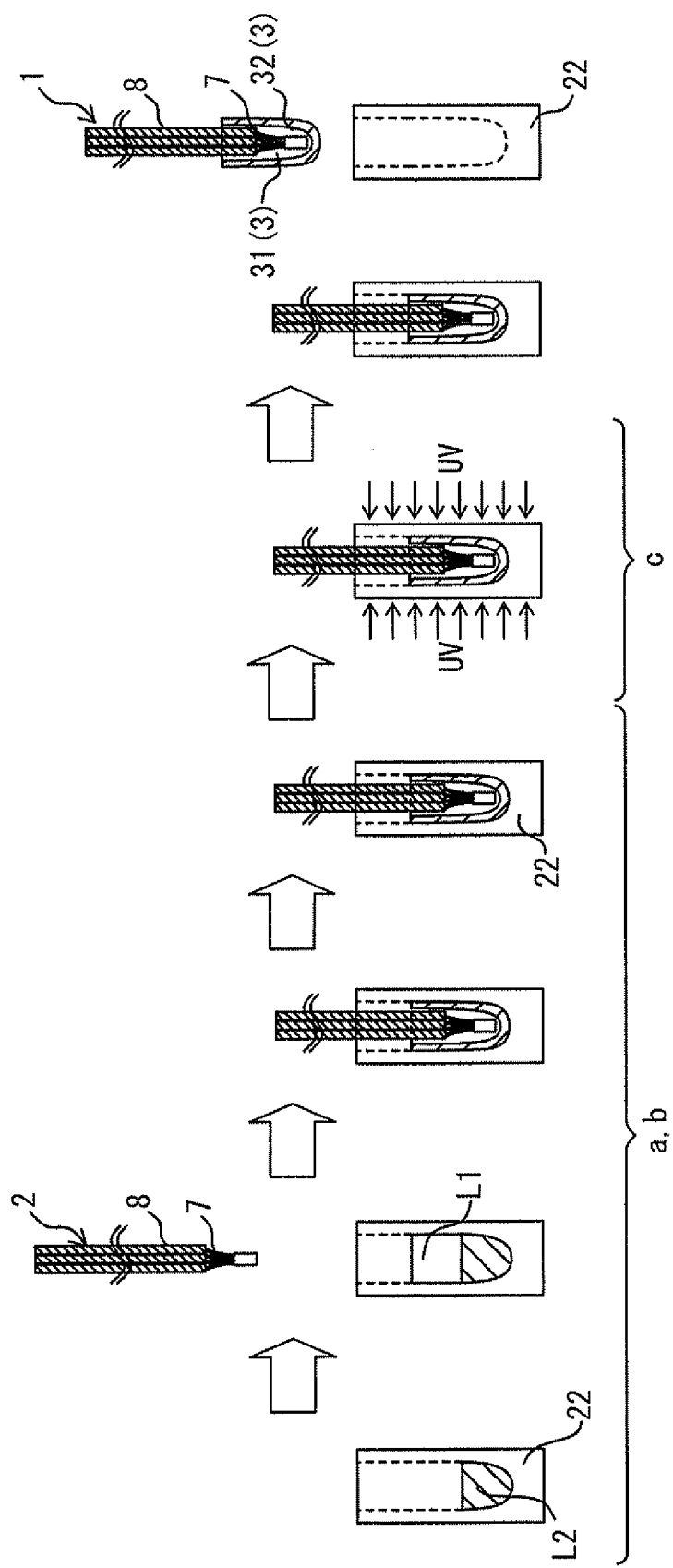
FIG. 12 is a view for schematically illustrating a method for producing a wiring harness of a fourth preferred embodiment of the present invention.

FIG. 12 is a view for schematically illustrating the method for producing the wiring harness of the present embodiment. The method for producing the wiring harness of the present embodiment includes an inner coat formation step (a), an outer coat formation step (b), and a light irradiation step (c), which are same as the method for producing the wiring harness of the third embodiment described above.

In the inner coat formation step (a) and the outer coat formation step (b) of the method for producing the wiring harness of the present embodiment, the first composition solution L1 and the second composition solution L2 are put in a transparent container 22 such that the first composition solution L1 is disposed at an upper level while the second composition solution L2 is disposed at a lower level, and the bunch of electric wires 2 is placed in the composition solutions from an upper surface of the composition solutions until the exposed bunched portion 7 and the end portion of the adjacent coated bunched portion 8 are immersed in the composition solutions to form the inner coat and the outer coat.

The transparent container 22 is made preferably from a transparent material such as a resin such as polyvinyl chloride (PVC), polypropylene (PP), fluorine resin (PFA, FEP), and quartz.

The first composition solution and the second composition solution used in the present embodiment are essentially same as the ones used in the third embodiment described above. However, the specific gravity of the first composition solution needs to be smaller than that of the second composition solution in order to dispose the first composition solution L1 at the upper level and the second composition solution L2 at the lower level. It is essential only if the difference between the specific gravities should be a minor difference such as the order of 0.01 g/cm².

It is preferable that after the bunch of electric wires 2 is placed in the composition solutions in the transparent container 22, a rotary motion is imparted to the container 22, or an up-and-down direction movement is imparted to the container 22 to vibrate the composition solutions in the transparent container 22 and accelerate mixing of the composition solutions.

The method for producing the wiring harness of the present embodiment is characterized in that the bunch of electric wires, on which the inner coat and the outer coat are formed in the inner coat formation step (a) and the outer coat formation step (b), is irradiated with light from the outside of the container 22 in the light irradiation step (c). In this light irradiation step, the inner coat 31 and the outer coat 32 formed on that the bunch of electric wires 2 are photocured. The spot that the light does not reach and cannot be photocured is cured by the redox copolymerization, which is same as the third embodiment.

It is preferable that the volume of the first composition solution at the upper level is set to be 0.5 times or less than that of the second composition solution at the lower level. When the volume of the first composition solution at the upper level is more than 0.5 times, the amount of the redox catalyst in the second composition solution that reacts with the thermal radical polymerization initiator in the first composition solution could go short.

Also in the present embodiment, it is preferable that the light irradiation step is performed under an inert gas atmosphere.

After the completion of the light irradiation step, the bunch of electric wires 2 is pulled out and separated from the transparent container 22, and thus the sealing member 3 is formed on the bunch of electric wires 2 as shown in FIG. 12. In this manner, the wiring harness 1 is produced, of which the end portion of the bunch of electric wires 2 is provided with the sealing member 3.

In addition, a detailed description of a method for producing a wiring harness of a fifth preferred embodiment of the present invention will now be provided.

Fifth Preferred Embodiment

The method for producing the wiring harness of the present embodiment differs in the shape of the bunch of electric wires 2 on which the sealing member 3 is formed. The bunch of electric wires 12 includes the splice 9 at its intermediate portion. The bunch of electric wires 12 used in the present embodiment has the splice 9 at its intermediate portion as described referring to FIG. 5.

Figure 13:
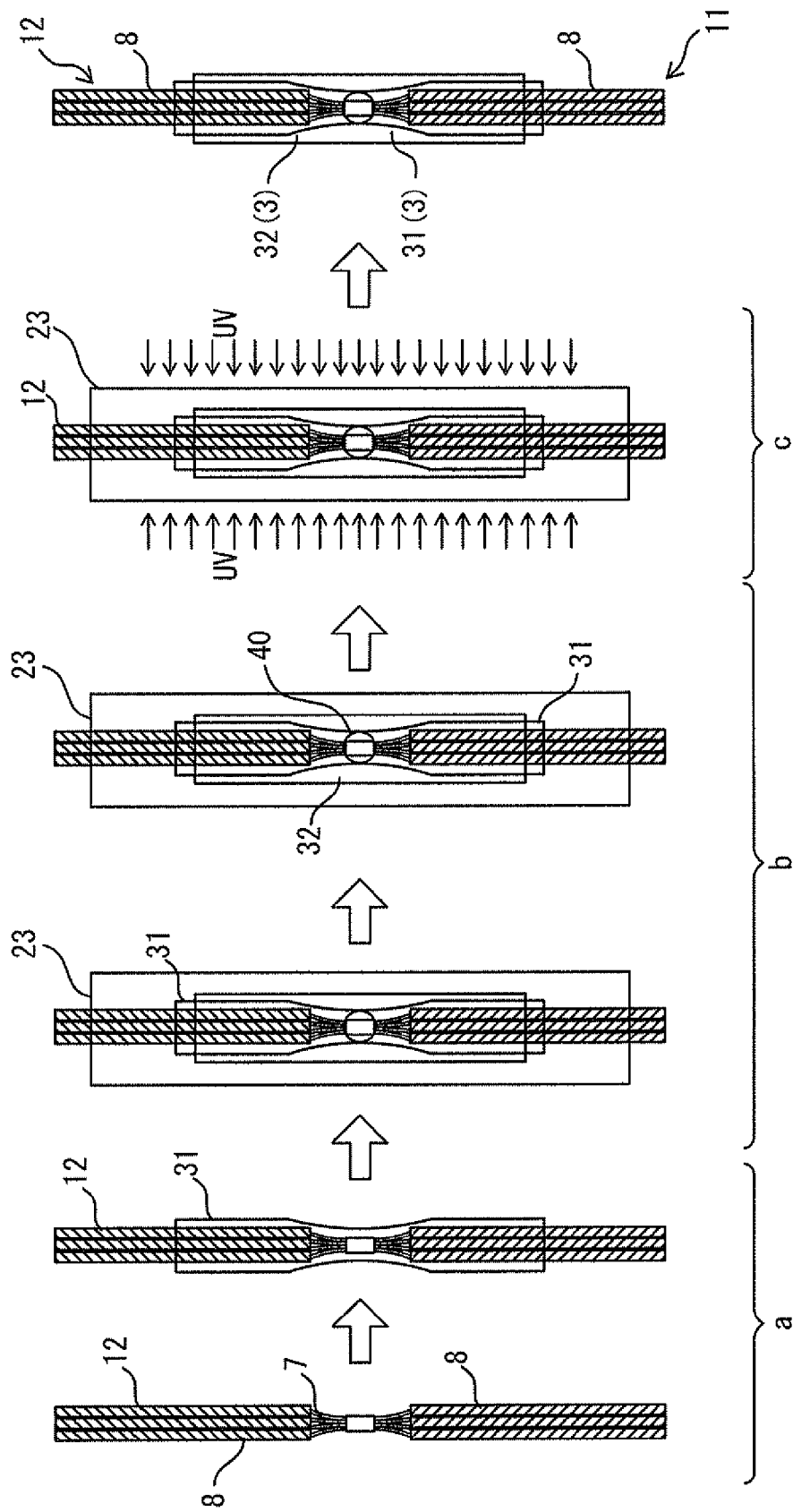
FIG. 13 is a view for schematically illustrating a method for producing a wiring harness of a fifth preferred embodiment of the present invention.

FIG. 13 is a view for schematically illustrating the method for producing the wiring harness of the present embodiment. The method for producing the wiring harness of the present embodiment includes an inner coat formation step (a), an outer coat formation step (b), and a light irradiation step (c), which are same as the method for producing the wiring harness of the third embodiment described above. The first composition solution and the second composition solution used in the present embodiment are same as those used in the third embodiment described above.

In the inner coat formation step of the present embodiment, the first composition solution is provided to the exposed bunched portion 7 and the end portions of the two adjacent coated bunched portions 8 of the bunch of electric wires 12. The provision of the first composition solution is performed by applying the first composition solution to the exposed bunched portion 7 and the end portions of the two adjacent coated bunched portions 8 of the bunch of electric wires 12 with the use of application means such as a gauze stick. In other preferred embodiments, the exposed bunched portion 7 and the end portions of the two adjacent coated bunched portions 8 of the bunch of electric wires 12 may be immersed in the first composition solution.

In this inner coat formation step, the first composition solution is provided to the bunch of electric wires 12, and the inner coat 31 made from the first composition solution is formed on the bunch of electric wires 12.

In the outer coat formation step of the present embodiment, the mold (transparent mold) 23 made from the transparent material such as quartz is used to form the outer coat. The bunch of electric wires 12 on which the inner coat 31 is formed is placed in the transparent mold (in a cavity thereof) such that the exposed bunched portion 7 is disposed in the substantial center in the cavity of the transparent mold 23. After the exposed bunched portion 7 is disposed, the second composition solution is poured in the cavity from the inlet 40 that communicates with the cavity. Then, the cavity is filled with the second composition solution, and the bunch of electric wires 12 on which the inner coat 31 is formed is immersed in the second composition solution. The size of the cavity of the mold 23 is determined as appropriate according to the size of outer coat to be formed on the bunch of electric wires 12. Thus, the outer coat 32 is formed on the inner coat 31 of the bunch of electric wires 12.

In the light irradiation step of the present embodiment, the bunch of electric wires 12 on which the outer coat is formed is irradiated with light while left in the transparent mold 23. Being irradiated with light (e.g., ultraviolet light in the present embodiment) from the outside of the transparent mold 23, the outer coat on the bunch of electric wires 12 is photocured. It is preferable that the light irradiation step is performed under an inert gas atmosphere also in the present embodiment.

After the completion of the light irradiation step, the bunch of electric wires 12 is pulled out of the transparent mold 23, and thus the wiring harness 11 is produced, of which the intermediate portion of the bunch of electric wires 12 is provided with the sealing member 3 as shown in FIG. 13.

Figure 14:
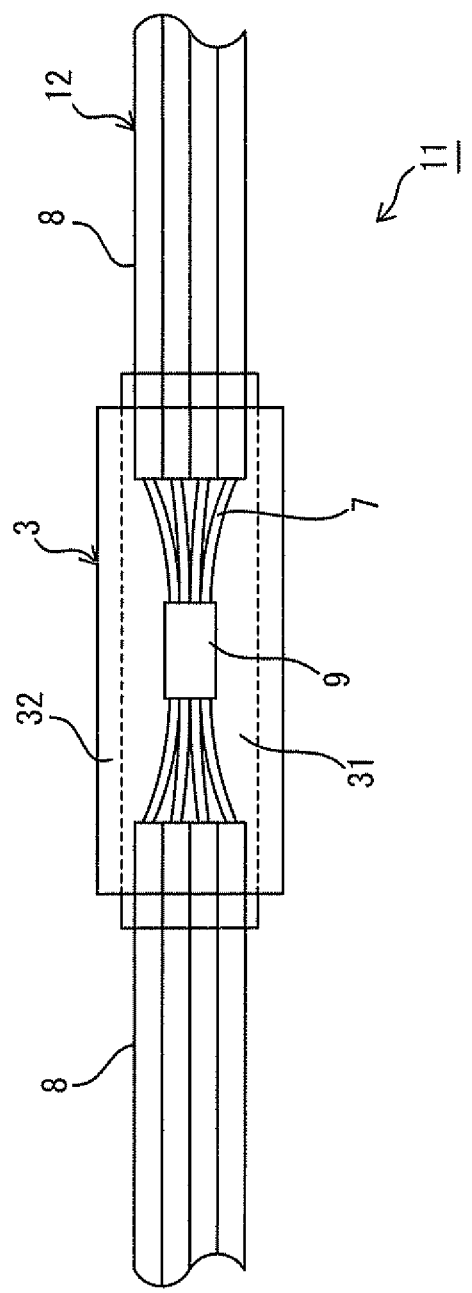
FIG. 14 is a view showing a schematic configuration of the wiring harness of the embodiment.

FIG. 14 is a view showing a schematic configuration of the wiring harness 11 that is produced in the method for producing the wiring harness of the present embodiment. In the wiring harness 11, the exposed bunched portion 7 that includes the splice 9 at the intermediate portion of the bunch of electric wires 12, and the end portions of the two adjacent coated bunched portions 8 are coated with the sealing member 3 as shown in FIG. 14.

Hereinafter, specific descriptions of the third to fifth embodiments are provided with reference to Examples; however, the present invention is not limited thereto.

Example 3

<Preparation of First Composition Solution>

The first composition solution was prepared by mixing the following compounds.

2,4,6-trimethyl benzoil diphenyl phosphine oxide (photo polymerization initiator) [manuf.: BASF, LUCIRIN TPO], 2 parts by mass Bis-(2,6-dimethoxybenzoyl)-2,4,4-trimethylpentylphosphine oxide (photo polymerization initiator) [manuf.: CIBA SPECIALTY CHEMICALS INC., IRGACURE 184], 1 part by mass Cumene hydroperoxide (thermal radical polymerization initiator) [manuf.: KAYAKUAKUZO CO, LTD., KAYAKUMEN], 4 parts by mass Urethane acrylate oligomer (polymerizable compound) [manuf.: JSR CORPORATION], 40 parts by mass Acrylate monomer (chain polymerizable compound), 50 parts by mass Iso-bornyl acrylate monomer (cyclic polymerizable compound) [manuf.: NIPPON SHOKUBAI CO., LTD.], 15 parts by mass Thiol compound (adherence auxiliary agent/curing accelerator): TMMP [manuf.: SAKAI CHEMICAL INDUSTRY CO., LTD.] 1 part by mass Ethylenebis(oxyethylene)bis[3-(5-tertbutyl-4-hydroxy-m-tolyl)]propionate (antioxidant) [manuf.: CIBA SPECIALTY CHEMICALS INC., IRGANOX 245], 0.3 parts by mass The first composition solution had a viscosity of 200 mPa·s, and a specific gravity of 1.04 g/cm$^3$.

<Bunch of Electric Wires Including a Splice at its End>

A bunch of electric wires including a splice at its end was prepared, the electric wires being made up of nine PVC electric wires each having an outer diameter of 1.8 mm.

<Inner Coat Formation Step>

1 ml of the first composition solution was poured in a PVC cap having an opening diameter of about 8 mm. The bunch of electric wires was placed in the first composition solution from its exposed bunched portion until the end portion of the coated bunched portion was immersed therein. The bunch of electric wires was left immersed therein for 5 seconds to form the inner coat. Then, the bunch of electric wires was pulled out of the first composition solution.

<Preparation of Second Composition Solution>

The second composition solution was prepared by mixing the following compounds.

2,4,6-trimethyl benzoil diphenyl phosphine oxide (photo polymerization initiator) [manuf.: BASF, LUCIRIN TPO], 2 parts by mass Bis-(2,6-dimethoxybenzoyl)-2,4,4-trimethylpentylphosphine oxide (photo polymerization initiator) [manuf.: CIBA SPECIALTY CHEMICALS INC., IRGACURE 184], 1 part by mass Ethyl hexanoate copper (II) (redox catalyst), 0.4 parts by mass Urethane acrylate oligomer (polymerizable compound) [manuf.: JSR CORPORATION] 35 parts by mass Acrylate monomer (chain polymerizable compound), 35 parts by mass N-vinyl pyrrolidone (cyclic polymerizable compound) [manuf.: NIPPON SHOKUBAI CO., LTD.], 30 parts by mass Ethylenebis(oxyethylene)bis[3-(5-tert-butyl-4-hydroxy-m-tolyl)]propionate (antioxidant) [manuf.: CIBA SPECIALTY CHEMICALS INC., IRGANOX 245], 0.3 parts by mass The second composition solution had a viscosity of 120 mPa·s, and a specific gravity of 1.03 g/cm$^3$.

<Outer Coat Formation Step>

1 ml of the second composition solution was poured in a PVC cap (transparent cap) that was similar to the one used in the inner coat formation step. The bunch of electric wires was placed in the second composition solution in the PVC cap such that the whole inner coat was immersed therein. Thus, the second composition solution that defined the outer coat was provided around the inner coat.

<Light Irradiation Step>

The bunch of electric wires while left in the second composition solution was disposed on a collecting portion (focal area) of a UV light irradiation device of 800 W including a metal halide lamp and a collection cold mirror (manuf.: ORC MANUFACTURING CO., LTD.). The bunch of electric wires was left as it was to be irradiated for 5 seconds with ultraviolet light. Thus, the second composition solution was photocured by ultraviolet light.

Then, the bunch of electric wires was pulled out of the UV light irradiation device and separated from the PVC cap. Thus, a wiring harness was obtained, which included a sealing member that enveloped the exposed bunched portion and the end portion of the coated bunched portion of the bunch of electric wires. The sealing member was about 10 mm long (in a longitudinal direction of the wiring harness) from the end portion (end) of the exposed bunched portion.

<Waterproof Performance Test>

As described above referring to FIG. 8, the obtained wiring harness was placed in water such that the end portion with the sealing member of the wiring harness sank under water. Then, 200 kPa of compressed air was injected into the electric wires from the other end portion of the wiring harness. A check for air leakage from the sealing member was made with eyes.

As a result, concerning the wiring harness of Example 3, air leakage from the sealing member (at a contact portion between the bunch of electric wires and the sealing member) was not found.

<Measurement of Degree of Cure>

The degree of cure of the outer coat, and the degree of cure of the spot among the conductors in the exposed bunched portion (i.e., the spot where the resin was cured between the elemental wires) in the inner coat of the sealing member of the wiring harness of Example 3 were obtained with the use of FT-IR.

The degree of cure of first composition solution (the degree of cure of the inner coat) was obtained as follows.

In the first composition yet to be cured, an absorption peak of methylene group at 2900 cm$^{-1}$, which did not change with the degree of cure, was set as a base peak, and the area of the base peak was set as an area Ac. Meanwhile, the area of a peak of acrylic group at 810 cm$^{-1}$, which changed with the degree of cure, was set as an area Aa. The area ratio of these areas in the composition solution that was yet to be cured was set as Aa/Ac=RL (0% degree of cure).

The area ratio of a cured film, which was prepared by irradiating the first composition solution with UV light of 500 mJ/cm$^2$ (under a nitrogen atmosphere) so as to have a film thickness of 130 μm, was set as Aa/Ac Rc (100% degree of cure).

A degree of cure Ds of a desired spot was obtained by the following equation as a ratio of two peak areas at this spot, Aa/Ac=Rs.

$$Ds=\{(Rs-RL)/(RL-Rc)\}\times 100(\%)$$

The degree of cure of the second composition solution (the degree of cure of the outer coat) was also obtained in the same manner as described above, except that the first composition solution was replaced with the second composition solution.

As a result, the degree of cure of the outer coat was 98%, and the degree of cure of the spot where the resin was cured between the elemental wires in the inner coat was 95%.

In this manner, it was found that the degree of cure of the spot that the UV light did not reach was close to the degree of cure of the spot that the UV light reached, and thus the degree of cure of the spot that the UV light did not reach was high.

Example 4

A wiring harness was produced, of which a bunch of electric wires includes a splice at its end portion to which a sealing member is provided, in the same manner as Example 3, except that a transparent cap made from polyethylene was used instead of the PVC cap used in Example 3. The transparent cap was separated from the sealing member by making a cut in the transparent cap and widening the cut. There was no damage or deformation in an outer coat of the sealing member in separating the transparent cap.

The wiring harness of Example 4 was also subjected to the waterproof performance test and the measurement of degree of cure similarly to Example 3.

As a result, concerning the wiring harness of Example 4, air leakage from the sealing member (at a contact portion between the bunch of electric wires and the sealing member) was not found.

The degree of cure of the outer coat was 98%, and the degree of cure of the spot where the resin was cured between the elemental wires in the inner coat was 93%.

Example 5

A wiring harness was produced, of which a bunch of electric wires includes a splice at its end portion to which a sealing member is provided, in the same manner as Example 1, except that the UV light irradiation device used in Example 3 was replaced with four spot UV light bundles that have a diameter of 5 mm and a light level of 750 mW/cm$^2$ (a UV spot light irradiation device: LC8 manufactured by HAMAMATSU PHOTONICS K.K.) to irradiate the bunch of electric wires in the PVC cap left in the second composition solution with ultraviolet light in four directions from the outside for 15 seconds.

The wiring harness of Example 5 was also subjected to the waterproof performance test and the measurement of degree of cure similarly to Example 3.

As a result, concerning the wiring harness of Example 5, air leakage from the sealing member (at a contact portion between the bunch of electric wires and the sealing member) was not found.

The degree of cure of the outer coat was 98%, and the degree of cure of the spot where the resin was cured between the elemental wires in the inner coat was 94%.

Example 6

<Preparation of First Composition Solution>

The first composition solution was prepared by mixing the following compounds.

2,4,6-trimethyl benzoyl diphenyl phosphine oxide (photo polymerization initiator) [manuf.: BASF, LUCIRIN TPO], 2 parts by mass Bis-(2,6-dimethoxybenzoyl)-2,4,4-trimethylpentylphosphine oxide (photo polymerization initiator) [manuf.: CIBA SPECIALTY CHEMICALS INC., IRGACURE 184], 1 part by mass benzoyl peroxide (thermal radical polymerization initiator) [Manuf.: KAYAKUAKUZO CO., LTD., PERKADOX], 2 parts by mass Urethane acrylate oligomer (polymerizable compound) [manuf.: JSR CORPORATION], 35 parts by mass Acrylate monomer (chain polymerizable compound), 25 parts by mass Iso-bornyl acrylate monomer (cyclic polymerizable compound) [manuf.: NIPPON SHOKUBAI CO., LTD.], 15 parts by mass Thiol compound (adherence auxiliary agent/curing accelerator): TMMP [manuf.: SAKAI CHEMICAL INDUSTRY CO., LTD.] 1 part by mass Ethylenebis(oxyethylene)bis[3-(5-tert-butyl-4-hydroxy-m-tolyl)]propionate (antioxidant) [manuf.: CIBA SPECIALTY CHEMICALS INC., IRGANOX 245], 0.3 parts by mass The first composition solution had a viscosity of 180 mPa·s, and a specific gravity of 1.02 g/cm$^3$.

<Preparation of Second Composition Solution>

The second composition solution was prepared by mixing the following compounds.

2,4,6-trimethyl benzoil diphenyl phosphine oxide (photo polymerization initiator) [manuf.: BASF, LUCIRIN TPO], 2 parts by mass Bis-(2,6-dimethoxybenzoyl)-2,4,4-trimethylpentylphosphine oxide (photo polymerization initiator) [manuf.: CIBA SPECIALTY CHEMICALS INC., IRGACURE 184], 1 part by mass saccharin (redox catalyst) [manuf.: DAITO CHEMICAL CO., LTD.], 0.2 parts by mass Urethane acrylate oligomer (polymerizable compound) [manuf.: JSR CORPORATION], 35 parts by mass Acrylate monomer (chain polymerizable compound), 35 parts by mass N-vinyl pyrrolidone (cyclic polymerizable compound) [manuf.: NIPPON SHOKUBAI CO., LTD.], 30 parts by mass The second composition solution had a viscosity of 100 mPa·s, and a specific gravity of 1.04 g/cm³.

<Bunch of Electric Wires Including a Splice at its End>

A bunch of electric wires including a splice at its end was prepared, the electric wires being made up of nine PVC electric wires each having an outer diameter of 1.8 mm.

<Inner Coat Formation Step and Outer Coat Formation Step>

0.5 ml of the second composition solution (base material) was first poured in a PVC cap (transparent cap) having an opening diameter of about 8 mm. Then, the first composition solution (primer) was disposed on the second composition solution. Thus, a two-layered composition solution consisting of the first composition at the upper level and the second composition solution at the lower level was obtained. The compositions at the upper and lower levels were in the state of not immediately spreading to mix. In this state, the bunch of electric wires was placed in the two-layered composition solution from its exposed bunched portion until the end portion of the coated bunched portion is immersed therein.

<Light Irradiation Step>

Then, the bunch of electric wires while left in the two-layered composition solution was disposed on a collecting portion (focal area) of a UV light irradiation device that is similar to the one used in Example 3. The bunch of electric wires was left as it was to be irradiated for 10 seconds with ultraviolet light. Thus, the second composition solution was photocured by ultraviolet light.

Then, the bunch of electric wires was pulled out of the UV light irradiation device and separated from the PVC cap. Thus, a wiring harness was obtained, which included a sealing member that enveloped the exposed bunched portion and the end portion of the coated bunched portion of the bunch of electric wires. The sealing member was about 10 mm long (in a longitudinal direction of the wiring harness) from the end portion (end) of the exposed bunched portion.

The wiring harness of Example 6 was also subjected to the waterproof performance test and the measurement of degree of cure similarly to Example 3.

As a result, concerning the wiring harness of Example 6, air leakage from the sealing member (at a contact portion between the bunch of electric wires and the sealing member) was not found.

The degree of cure of the outer coat was 98%, and the degree of cure of the spot where the resin was cured between the elemental wires in the inner coat was 92%.

Example 7

A wiring harness was produced, of which a bunch of electric wires includes a splice at its end portion to which a sealing member is provided, in the same manner as Example 6, except that a transparent cap made from polyfluoroacetate (PFA) was used instead of the PVC cap used in Example 6. The transparent cap was separated from the sealing member by making a cut in the transparent cap and widening the cut. There was no damage or deformation in an outer coat of the sealing member in separating the transparent cap.

The wiring harness of Example 7 was also subjected to the waterproof performance test and the measurement of degree of cure similarly to Example 3.

As a result, concerning the wiring harness of Example 7, air leakage from the sealing member (at a contact portion between the bunch of electric wires and the sealing member) was not found.

The degree of cure of the outer coat was 98%, and the degree of cure of the spot where the resin was cured between the elemental wires in the inner coat was 92%.

Example 8

A wiring harness was produced, of which a bunch of electric wires includes a splice at its end portion to which a sealing member is provided, in the same manner as Example 6, except that the two-layered composition solution was vibrated by simultaneously imparting 5 times of up-and-down direction movement of 5 mm and 5 times of rotary motion of ±45 degrees only to the PFA cap with the use of an external driving device before the light irradiation step.

The wiring harness of Example 8 was also subjected to the waterproof performance test and the measurement of degree of cure similarly to Example 3.

As a result, concerning the wiring harness of Example 8, air leakage from the sealing member (at a contact portion between the bunch of electric wires and the sealing member) was not found.

The degree of cure of the outer coat was 98%, and the degree of cure of the spot where the resin was cured between the elemental wires in the inner coat was 92%.

Example 9

<Bunch of Electric Wires Including a Splice at its Intermediate Portion>

Five PVC electric wires each having an outer diameter of 1.8 mm were prepared, and insulations at the intermediate portions of the electric wires were removed. Then, the exposed conductors were connected to each other by crimping to form a splice. Thus, a bunch of electric wires including a splice at its intermediate portion was prepared.

<Preparation of First Composition Solution and Second Composition Solution>

A first composition solution and a second composition solution same as Example 3 were used.

<Inner Coat Formation Step>

Provision of the first composition solution is performed by applying the first composition solution to the exposed bunched portion that includes the splice at the intermediate portion of the bunch of electric wires, and the end portions of the two adjacent coated bunched portions with the use of a gauze stick. The first composition solution was applied on the entire surfaces of the exposed bunched portion and the end portions of the two adjacent coated bunched portions. Thus, an inner coat was formed on the bunch of electric wires.

<Outer Coat Formation Step>

Then, a portion of the bunch of electric wires where the inner coat was provided was placed in a mold made from quartz that is thinly coated with a fluorinated mold release agent. The second composition solution was poured in the mold from an inlet of the mold, and the space around the inner coat was filled with the second composition solution.

<Light Irradiation Step>

Then, the bunch of electric wires was disposed on a collecting portion (focal area) of a UV light irradiation device that is similar to the one used in Example 3. The bunch of electric wires was irradiated for 5 seconds with ultraviolet light. The splice was left still on the collecting portion (focal area).

Then, the bunch of electric wires was pulled out of the UV light irradiation device and separated from the mold. Thus, a wiring harness was obtained, which included a sealing member that enveloped the exposed bunched portion at the intermediate portion of the bunch of electric wires, and the end portions of the two adjacent coated bunched portions. The sealing member was about 15 mm long (in a longitudinal direction of the wiring harness).

<Waterproof Performance Test>

The obtained wiring harness was placed in water such that the sealing member at the intermediate portion of the wiring harness sank under water. Then, 200 kPa of compressed air was injected into the electric wires from both ends of the wiring harness. A check for air leakage from the sealing member was made with eyes.

As a result, concerning the wiring harness of Example 9, air leakage from the sealing member (at a contact portion between the bunch of electric wires and the sealing member) was not found.

<Measurement of Degree of Cure>

The degree of cure of the outer coat, and the degree of cure of the spot among the conductors in the exposed bunched portion (i.e., the spot where the resin was cured between the elemental wires) in the inner coat of the sealing member of the wiring harness of Example 9 were obtained with the use of FT-IR similarly to Example 3.

As a result, the degree of cure of the outer coat was 98%, and the degree of cure of the spot where the resin was cured between the elemental wires in the inner coat was 92%.

Comparative Example 2

A sealing member having a configuration similar to Example 1 was formed by using composition solutions similar to the composition solutions used in Example 3, while in Comparative Example 2, no thermal radical polymerization initiator was used in the first composition solution, and no redox catalyst was used in the second composition solution. Then, 200 kPa of compressed air was injected into the electric wires from one end portion of the wiring harness. Air leakage from the other end port ion of the electric wires and air leakage from the sealing member (at a contact portion between the bunch of electric wires and the sealing member) were observed. In addition, the degree of cure of the outer coat was 97%, which was almost same as that of Example 1; however, the degree of cure of the spot where the resin was cured between the elemental wires in the inner coat was 5% or less, which was almost uncured.

Comparative Example 3

A sealing member having a configuration similar to Example 4 was formed by using composition solutions similar to the composition solutions used in Example 6, while in Comparative Example 3, no thermal radical polymerization initiator was used in the first composition solution, and no redox catalyst was used in the second composition solution. Then, 200 kPa of compressed air was injected into the electric wires from one end portion of the wiring harness. Air leakage from the other end port ion of the electric wires and air leakage from the sealing member (at a contact portion between the bunch of electric wires and the sealing member) were observed. In addition, the degree of cure of the outer coat was 97%, which was almost same as that of Example 4; however, the degree of cure of the spot where the resin was cured between the elemental wires in the inner coat was 5 or less, which was almost uncured.

Comparative Example 4

A sealing member having a configuration similar to Example 9 was formed by using composition solutions similar to the composition solutions used in Example 7, while in Comparative Example 4, no thermal radical polymerization initiator was used in the first composition solution, and no redox catalyst was used in the second composition solution. Then, 200 kPa of compressed air was injected into the electric wires from one end portion of the wiring harness. Air leakage from the other end portion of the electric wires and air leakage from the sealing member (at a contact portion between the bunch of electric wires and the sealing member) were observed. In addition, the degree of cure of the outer coat was 97%, which was almost same as that of Example 7; however, the degree of cure of the spot where the resin was cured between the elemental wires in the inner coat was 5% or less, which was almost uncured.

The invention claimed is:

1. A wiring harness comprising:
a bunch of electric wires comprising a plurality of insulated electric wires, each of which comprises a conductor and an insulation with which a portion of the conductor is coated while the other portion is exposed, the bunch of electric wires comprising:
an exposed bunched portion comprising a splice, the exposed bunched portion defining a spot at which the exposed portions of the conductors of the insulated electric wires are bunched and connected to each other; and
a coated bunched portion that defines a spot at which the coated portions of the conductors of the insulated electric wires are bunched; and
a sealing member arranged to seal all of the exposed bunched portion, and an end portion of the coated bunched portion that is adjacent to the exposed bunched portion,
wherein the sealing member comprises a resin that is cured by photo polymerization and redox copolymerization.

2. The wiring harness according to claim 1, wherein the resin of the sealing member comprises a cured object of a composition solution containing a photo polymerization initiator, a thermal radical polymerization initiator, a redox catalyst, and a polymerizable compound.

3. The wiring harness according to claim 1, wherein the sealing member has a Young's moduli of 10 MPa to 1000 MPa and an adhesion property of 100 N/m or more.

4. The wiring harness according to claim 1, wherein the sealing member comprises a thiol compound.

5. The wiring harness according to claim 1, wherein the sealing member comprises a urethane acrylate oligomer, an acrylate monomer, and a cyclic N-vinyl monomer.

6. A method for producing the wiring harness according to claim 1, comprising a coat formation step of forming the sealing member by applying a composition solution containing at least a photo polymerization initiator, a thermal radical polymerization initiator, a redox catalyst, and a polymerizable compound to the exposed bunched portion and the adjacent coated bunched portion; and a light irradiation step of irradiating the sealing member formed on the exposed bunched portion and the adjacent coated bunched portion with light to photocure the sealing member.

7. The method according to claim 6, wherein in the coat formation step, the composition solution is put in transparent a container, and the bunch of electric wires is placed in the composition solution in the container from an upper surface of the composition solution until the exposed bunched portion and the end portion of the adjacent coated bunched portion are immersed in the composition solution to form a coat on the exposed bunched portion and the end portion of the adjacent coated bunched portion, and in the light irradiation step, the coat is irradiated with the light from the outside of the container.

8. The method according to claim 7, wherein the polymerizable compound contains a urethane acrylate oligomer, a chain acrylate monomer, either one or both of a cyclic acrylate monomer and a cyclic N-vinyl monomer, and a thiol compound.

9. The method according to claim 6, wherein in the coat formation step, the bunch of electric wires is placed in a transparent mold, and the composition solution is put in the mold to form a coat on the exposed bunched portion and the end portion of the adjacent coated bunched portion, and in the light irradiation step, the coat is irradiated with the light from the outside of the mold.

10. The method according to claim 9, wherein the polymerizable compound contains a urethane acrylate oligomer, a chain acrylate monomer, either one or both of a cyclic acrylate monomer and a cyclic N-vinyl monomer, and a thiol compound.

11. The method according to claim 6, wherein the polymerizable compound contains a urethane acrylate oligomer, a chain acrylate monomer, either one or both of a cyclic acrylate monomer and a cyclic N-vinyl monomer, and a thiol compound.

12. A wiring harness comprising:
a bunch of electric wires comprising a plurality of insulated electric wires, each of which comprises a conductor and an insulation with which a portion of the conductor is coated while the other portion is exposed, the bunch of electric wires comprising:
an exposed bunched portion comprising a splice, the exposed bunched portion defining a spot at which the exposed portions of the conductors of the insulated electric wires are bunched and connected to each other; and
a coated bunched portion that defines a spot at which the coated portions of the conductors of the insulated electric wires are bunched; and
a sealing member that comprises a photocured resin, and is arranged to seal all of the exposed bunched portion, and an end portion of the coated bunched portion that is adjacent to the exposed bunched portion,
wherein the sealing member comprises:
an inner coat with which the exposed bunched portion and the end portion of the adjacent coated bunched portion are coated, the inner coat comprising a resin that is cured by redox copolymerization; and
an outer coat that envelops the inner coat.

13. The wiring harness according to claim 12, wherein the inner coat comprises a cured object of a first composition solution containing at least a photo polymerization initiator, a thermal radical polymerization initiator, and a polymerizable compound, and
the outer coat comprises a cured object of a second composition solution containing at least a photo polymerization initiator, a redox catalyst, and a polymerizable compound.

14. The wiring harness according to claim 12, wherein the inner coat and the outer coat have a Young's moduli of 10 MPa to 1000 MPa and an adhesion property of 100 N/m or more.

15. The wiring harness according to claim 12, wherein the inner coat comprises a thiol compound.

16. The wiring harness according to claim 12, wherein:
the inner coat comprises a urethane acrylate oligomer and an acrylate monomer; and
the outer coat comprises a urethane acrylate oligomer, an acrylate monomer, and a cyclic N-vinyl monomer.

17. A method for producing the wiring harness according to claim 12, comprising
an inner coat formation step of forming an the inner coat of the sealing member by providing applying a first composition solution containing at least a photo polymerization initiator, a thermal radical polymerization initiator, and a polymerizable compound to the exposed bunched portion and the end of the adjacent coated bunched portion;
an outer coat formation step of forming the outer coat of the sealing member by applying a second composition solution containing at least a photo polymerization initiator, a redox catalyst, and a polymerizable compound to the inner coat; and
a light irradiation step of irradiating the sealing member consisting of the inner coat and the outer coat with light to photocure the sealing member.

18. The method according to claim 17, wherein in the inner coat formation step and the outer coat formation step, the inner coat and the outer coat are formed in sequence on the exposed bunched portion and the end portion of the adjacent coated bunched portion by putting the first composition solution and the second composition solution in a transparent container such that the first composition solution is disposed at an upper level while the second composition solution is disposed at a lower level, and placing the bunch of electric wires in the composition solutions in the container from an upper surface of the composition solutions until the exposed bunched portion and the end portion of the adjacent coated bunched portion are immersed in the composition solutions, and in the light irradiation step, the inner and outer coats are irradiated with the light from the outside of the container.

19. The method according to claim 18, wherein the polymerizable compound in the first composition solution contains a urethane acrylate oligomer, a chain acrylate monomer, a cyclic acrylate monomer, and a thiol compound, and the polymerizable compound in the second composition solution contains a urethane acrylate oligomer, a chain acrylate monomer, and either one or both of a cyclic acrylate monomer and a cyclic N-vinyl monomer.

20. The method according to claim 17, wherein the polymerizable compound in the first composition solution contains a urethane acrylate oligomer, a chain acrylate monomer, a cyclic acrylate monomer, and a thiol compound, and the polymerizable compound in the second composition solution contains a urethane acrylate oligomer, a chain acrylate monomer, and either one or both of a cyclic acrylate monomer and a cyclic N-vinyl monomer.

\* \* \* \* \*